US012137017B2

(12) United States Patent
Zhang et al.

(10) Patent No.: US 12,137,017 B2
(45) Date of Patent: Nov. 5, 2024

(54) PRECODED PHASE TRACKING REFERENCE SIGNAL SEQUENCE WITH DISTRIBUTED ALLOCATION

(71) Applicant: QUALCOMM Incorporated, San Diego, CA (US)

(72) Inventors: Xiaoxia Zhang, San Diego, CA (US); Ahmed Abdelaziz Ibrahim Abdelaziz Zewail, San Diego, CA (US); Zhifei Fan, San Diego, CA (US); Tianyang Bai, Somerville, NJ (US); Tao Luo, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 17/727,378

(22) Filed: Apr. 22, 2022

(65) Prior Publication Data

US 2022/0368581 A1 Nov. 17, 2022

Related U.S. Application Data

(60) Provisional application No. 63/181,868, filed on Apr. 29, 2021.

(51) Int. Cl.
*H04L 27/26* (2006.01)
*H04L 5/00* (2006.01)

(52) U.S. Cl.
CPC ........ *H04L 27/2636* (2013.01); *H04L 5/0051* (2013.01); *H04L 27/2607* (2013.01); *H04L 27/2613* (2013.01)

(58) Field of Classification Search
CPC ............. H04L 27/2607; H04L 27/2613; H04L 27/2636; H04L 5/0048; H04L 5/0051
See application file for complete search history.

(56) References Cited

U.S. PATENT DOCUMENTS

2020/0007369 A1* 1/2020 Ciochina-Duchesne ....................
H04L 27/2607

\* cited by examiner

*Primary Examiner* — Melvin C Marcelo
*Assistant Examiner* — Natali Pascual Peguero
(74) *Attorney, Agent, or Firm* — Holland & Hart LLP

(57) ABSTRACT

Methods, systems, and devices for wireless communications are described. A device may precode a phase tracking reference signal (PTRS) sequence by applying a single discrete Fourier transform (DFT) to the PTRS sequence. The device may map the DFT precoded PTRS sequence to a subset of resources of a set of resources, and may transmit a signal carrying the DFT precoded PTRS sequence. Additionally or alternatively, the device may receive a signal that includes a DFT precoded PTRS sequence, demap the DFT precoded PTRS sequence to a subset of resources of a set of resources, decode the DFT precoded PTRS by applying a single inverse DFT (IDFT) to the DFT precoded PTRS sequence, estimate a phase error based on the decoding, and apply a phase error correction to a set of additional symbols associated with the signal based on the estimated phase error.

30 Claims, 19 Drawing Sheets

PRECODED PHASE TRACKING REFERENCE SIGNAL SEQUENCE WITH DISTRIBUTED ALLOCATION

CROSS REFERENCE

The present Application for Patent claims the benefit of U.S. Provisional Patent Application No. 63/181,868 by ZHANG et al., entitled "PRECODED PHASE TRACKING REFERENCE SIGNAL SEQUENCE WITH DISTRIBUTED ALLOCATION," filed Apr. 29, 2021, assigned to the assignee hereof, and expressly incorporated by reference herein.

FIELD OF TECHNOLOGY

The following relates to wireless communications, including precoded phase tracking reference signal (PTRS) sequence with distributed allocation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform (DFT) spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some communication devices may perform multiple DFTs on PTRS sequences. Additionally, some communication devices may perform multiple inverse DFTs (IDFTs) on PTRS sequences. However, performing multiple DFTs and multiple IDFTs for some processes may result in challenges, such as higher power consumption, slower operation, increased complexity, among other issues.

SUMMARY

The described techniques relate to improved methods, systems, devices, and apparatuses that support a precoded PTRS sequence with distributed allocation. A transmitter communication device, such as a base station or a UE may apply a single DFT to a PTRS sequence. Alternatively, a receiver communication device, such as a base station or a UE may apply a single IDFT to a PTRS sequence. One or more of the transmitter communication device or the receiver communication device may map an output, or portions of the output, of the single DFT or single IDFT to clusters of resource elements (e.g., PTRS clusters). The number of DFT and IDFT operations may be less than the number of clusters of resource elements (e.g., PTRS clusters). By applying a single DFT to the PTRS sequence at the transmitter communication device and by applying a single IDFT to the PTRS sequence at the receiver communication device, these communication devices may experience lower power consumption, faster operation, among other benefits.

A method for wireless communication is described. The method may include receiving a signal that includes a DFT precoded PTRS sequence, the DFT precoded PTRS sequence including a DFT precoded set of multiple symbols, demapping the DFT precoded PTRS sequence to a subset of resources of a set of resources, the subset of resources including one or more PTRS resource elements, decoding the DFT precoded PTRS by applying a single inverse DFT to the DFT precoded PTRS sequence, estimating a phase error based on the decoding, and applying a phase error correction to a set of multiple additional symbols associated with the signal based on the estimated phase error.

An apparatus for wireless communication is described. The apparatus may include a processor, and a memory coupled with the processor, wherein the memory comprises instructions executable by the processor to cause the apparatus to receive a signal that includes a DFT precoded PTRS sequence, the DFT precoded PTRS sequence including a DFT precoded set of multiple symbols, demap the DFT precoded PTRS sequence to a subset of resources of a set of resources, the subset of resources including one or more PTRS resource elements, decode the DFT precoded PTRS by applying a single inverse DFT to the DFT precoded PTRS sequence, estimate a phase error based on the decoding, and apply a phase error correction to a set of multiple additional symbols associated with the signal based on the estimated phase error.

Another apparatus for wireless communication is described. The apparatus may include means for receiving a signal that includes a DFT precoded PTRS sequence, the DFT precoded PTRS sequence including a DFT precoded set of multiple symbols, means for demapping the DFT precoded PTRS sequence to a subset of resources of a set of resources, the subset of resources including one or more PTRS resource elements, means for decoding the DFT precoded PTRS by applying a single inverse DFT to the DFT precoded PTRS sequence, means for estimating a phase error based on the decoding, and means for applying a phase error correction to a set of multiple additional symbols associated with the signal based on the estimated phase error.

A non-transitory computer-readable medium storing code for wireless communication is described. The code may include instructions executable by a processor to receive a signal that includes a DFT precoded PTRS sequence, the DFT precoded PTRS sequence including a DFT precoded set of multiple symbols, demap the DFT precoded PTRS sequence to a subset of resources of a set of resources, the subset of resources including one or more PTRS resource elements, decode the DFT precoded PTRS by applying a single inverse DFT to the DFT precoded PTRS sequence, estimate a phase error based on the decoding, and apply a phase error correction to a set of multiple additional symbols associated with the signal based on the estimated phase error.

In some examples of the method, apparatuses, and non-transitory computer-readable medium described herein, a number of inverse DFT operations associated with the single inverse DFT may be less than a number of PTRS resource clusters.

Some examples of the method, apparatuses, and non-transitory computer-readable medium described herein may further include operations, features, means, or instructions for applying a fast Fourier transform (FFT) to the received signal that includes the DFT precoded PTRS.

Some examples of the method, apparatuses, and non-transitory computer-readable medium described herein may further include operations, features, means, or instructions for applying a minimum mean square error (MMSE) equalization to a portion of the demapped DFT precoded PTRS sequence.

Some examples of the method, apparatuses, and non-transitory computer-readable medium described herein may further include operations, features, means, or instructions for outputting an estimated time domain signal based on decoding the DFT precoded PTRS.

In some examples of the method, apparatuses, and non-transitory computer-readable medium described herein, estimating the phase error may include operations, features, means, or instructions for comparing the estimated time domain signal to the received signal that includes the DFT precoded PTRS sequence.

In some examples of the method, apparatuses, and non-transitory computer-readable medium described herein, estimating the phase error may include operations, features, means, or instructions for determining a phase noise coefficient.

Some examples of the method, apparatuses, and non-transitory computer-readable medium described herein may further include operations, features, means, or instructions for determining a set of guard tones adjacent to a set of PTRS tones.

Some examples of the method, apparatuses, and non-transitory computer-readable medium described herein may further include operations, features, means, or instructions for nulling a set of data tones and refraining from nulling one or more of the set of guard tones or the set of PTRS tones.

In some examples of the method, apparatuses, and non-transitory computer-readable medium described herein, demapping the DFT precoded PTRS sequence may include operations, features, means, or instructions for demapping the DFT precoded PTRS sequence including the DFT precoded set of multiple symbols to a set of multiple subsets of resources of the set of resources, each subset of resources including the one or more PTRS resource elements.

A method for wireless communication is described. The method may include precoding a PTRS sequence by applying a single DFT to the PTRS sequence, the DFT precoded PTRS sequence including a DFT precoded set of multiple symbols, mapping the DFT precoded PTRS sequence to a subset of resources of a set of resources, the subset of resources including one or more PTRS resource elements, and transmitting a signal carrying the DFT precoded PTRS sequence.

An apparatus for wireless communication is described. The apparatus may include a processor, and a memory coupled with the processor, wherein the memory comprises instructions executable by the processor to cause the apparatus to precode a PTRS sequence by applying a single DFT to the PTRS sequence, the DFT precoded PTRS sequence including a DFT precoded set of multiple symbols, map the DFT precoded PTRS sequence to a subset of resources of a set of resources, the subset of resources including one or more PTRS resource elements, and transmit a signal carrying the DFT precoded PTRS sequence.

Another apparatus for wireless communication is described. The apparatus may include means for precoding a PTRS sequence by applying a single DFT to the PTRS sequence, the DFT precoded PTRS sequence including a DFT precoded set of multiple symbols, means for mapping the DFT precoded PTRS sequence to a subset of resources of a set of resources, the subset of resources including one or more PTRS resource elements, and means for transmitting a signal carrying the DFT precoded PTRS sequence.

A non-transitory computer-readable medium storing code for wireless communication is described. The code may include instructions executable by a processor to precode a PTRS sequence by applying a single DFT to the PTRS sequence, the DFT precoded PTRS sequence including a DFT precoded set of multiple symbols, map the DFT precoded PTRS sequence to a subset of resources of a set of resources, the subset of resources including one or more PTRS resource elements, and transmit a signal carrying the DFT precoded PTRS sequence.

In some examples of the method, apparatuses, and non-transitory computer-readable medium described herein, a number of DFT operations associated with the single DFT may be less than a number of PTRS resource clusters.

Some examples of the method, apparatuses, and non-transitory computer-readable medium described herein may further include operations, features, means, or instructions for applying an IFFT to the mapped DFT precoded PTRS sequence.

In some examples of the method, apparatuses, and non-transitory computer-readable medium described herein, mapping the DFT precoded PTRS sequence may include operations, features, means, or instructions for inserting a set of multiple guard tones adjacent to the subset of resources of the set of resources, the subset of resources including the one or more PTRS resource elements.

Some examples of the method, apparatuses, and non-transitory computer-readable medium described herein may further include operations, features, means, or instructions for receiving control signaling including an indication of a set of guard tones to insert adjacent to the subset of resources of the set of resources and where the control signaling includes a radio resource control (RRC) signaling, a downlink control information (DCI) message, or a medium access control (MAC) control element (MAC-CE).

Some examples of the method, apparatuses, and non-transitory computer-readable medium described herein may further include operations, features, means, or instructions for receiving control signaling including an indication of a quantity of the one or more PTRS resource elements included in the subset of resources of the set of resources and where the control signaling includes an RRC signaling, a DCI message, or a MAC-CE.

In some examples of the method, apparatuses, and non-transitory computer-readable medium described herein, mapping the DFT precoded PTRS sequence may include operations, features, means, or instructions for mapping the DFT precoded PTRS sequence to a set of multiple subsets of resources of the set of resources, each subset of resources including the one or more PTRS resource elements.

DETAILED DESCRIPTION

A transmitter communication device may transmit a PTRS to a receiver communication device for phase noise correction in various signals. The transmitter communication device may apply multiple DFTs to PTRS sequences, map each output of each DFT to respective clusters of resource elements (e.g., tones), and transmit the PTRS sequences to the receiver communication device. The receiver communication device may apply multiple IDFTs to the PTRS sequences, each IDFT corresponding to a respective cluster of resource elements. The receiver communication device may determine and correct for the phase noise. However, in some cases, applying multiple DFTs to the PTRS sequences at the transmitter communication device, and applying multiple IDFTs to the PTRS sequences at the receiver communication device may introduce issues, such as higher power consumption, slower operation, increased complexity, and other issues.

Various aspects of the present disclosure relate to enabling a transmitter communication device to apply a single DFT to the PTRS sequences, and the receiver communication device to apply a single IDFT to the PTRS sequences. The transmitter communication device may apply the single DFT to the PTRS sequences, and may map an output, or portions of the output, of the single DFT to clusters of resource elements. The receiver communication device may apply the single IDFT to the PTRS sequences. The single IDFT may process PTRS information corresponding to each cluster of resource elements. By applying a single DFT to the PTRS sequences at the transmitter communication device and by applying a single IDFT to the PTRS sequences at the receiver communication device, these communication device devices may experience power saving, reduced latency for wireless communications, as well as increased reliability of wireless communications, among other benefits.

Aspects of the disclosure are initially described in the context of wireless communications systems. Aspects of the disclosure are further illustrated by and described with reference to apparatus diagrams, system diagrams, and flowcharts that relate to a precoded PTRS sequence with distributed allocation.

Figure 1:
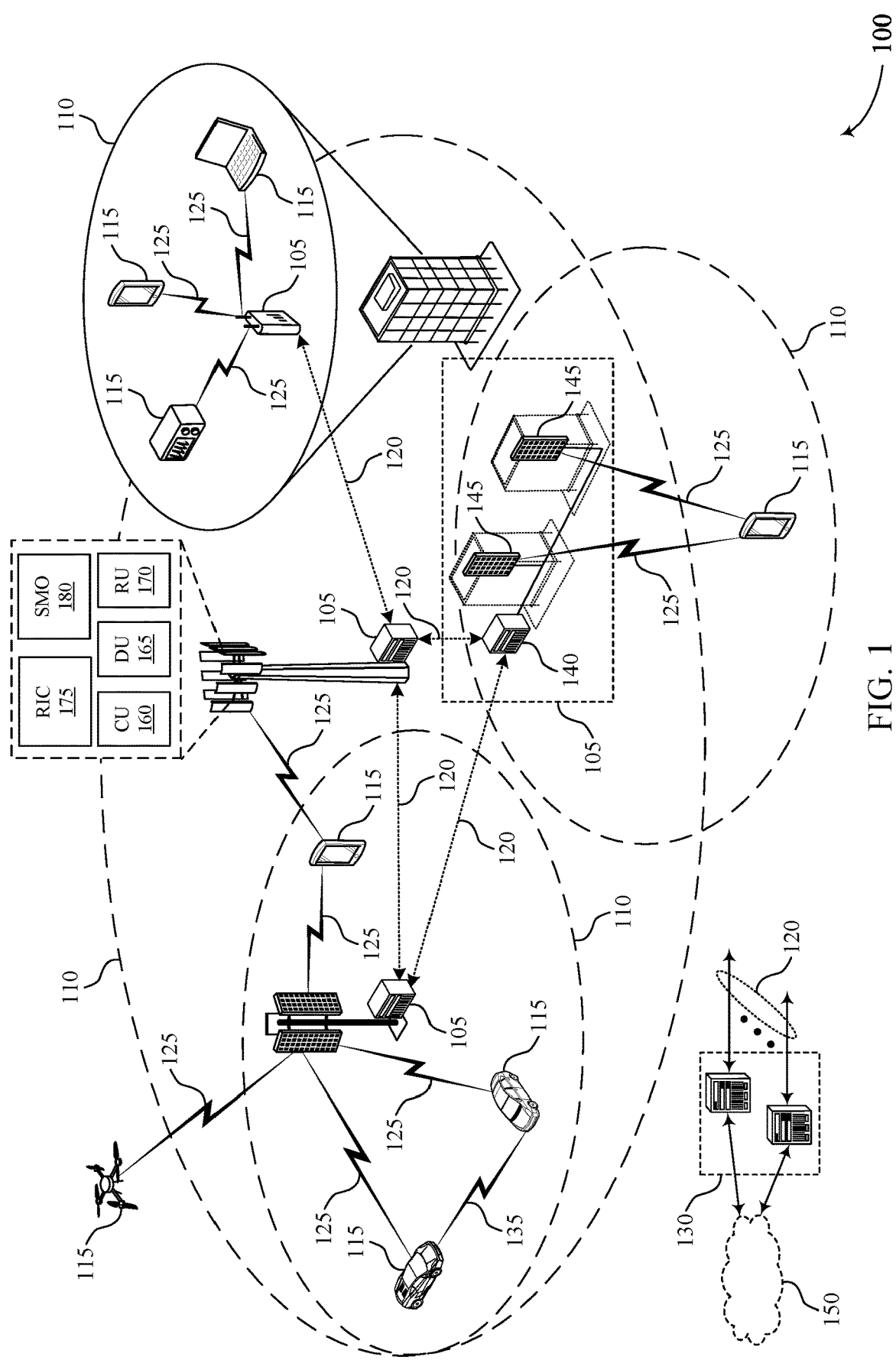
FIGS. 1 and 2 illustrate examples of wireless communications systems that support a precoded PTRS sequence with distributed allocation in accordance with aspects of the present disclosure.

FIG. 1 illustrates an example of a wireless communications system 100 that supports a precoded PTRS sequence with distributed allocation in accordance with aspects of the present disclosure. The wireless communications system 100 may include one or more base stations 105, one or more UEs 115, and a core network 130. In some examples, the wireless communications system 100 may be a LTE network, an LTE-A network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a network entity, a network device, base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). The more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported DFT size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

In some examples, a network device (e.g., a base station 105) may be implemented in a disaggregated architecture (for example, a disaggregated base station architecture, a disaggregated RAN architecture), which may be configured to utilize a protocol stack that is physically or logically distributed among two or more network devices, such as an integrated access backhaul (IAB) network, an open RAN (O-RAN) (for example, a network configuration sponsored by the O-RAN Alliance), or a virtualized RAN (vRAN) (for example, a cloud RAN (C-RAN)). For example, a base station 105 may include one or more of a central unit (CU) 160, a distributed unit (DU) 165, a radio unit (RU) 170, a RAN Intelligent Controller (RIC) 175 (for example, a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a TRP. One or more components of the base stations 105 in a disaggregated RAN architecture may be co-located, or one or more components of the base stations 105 may be located in distributed locations (for example, separate physical locations). In some examples, one or multiple base stations 105 of a disaggregated RAN architecture may be implemented as virtual units (for example, a virtual CU (VCU), a virtual DU (VDU), a virtual RU (VRU)).

The split of functionality between a CU 160, a DU 165, and an RU 170 is flexible and may support different functionalities depending upon which functions (for example, network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or multiple layers of the protocol stack and the DU 165 may support one or multiple different layers of the protocol stack. In some examples, the CU 160 may host upper protocol layer (for example, layer 3 (L3), layer 2 (L2)) functionality and signaling (for example, Radio Resource Control (RRC), service data adaption protocol (SDAP), Packet Data Convergence Protocol (PDCP)). The CU 160 may be connected to one or multiple DUs 165 or RUs 170, and the one or multiple DUs 165 or RUs 170 may host lower protocol layers, such as layer 1 (L1) (for example, physical (PHY) layer) or L2 (for example, radio link control (RLC) layer, medium access control (MAC) layer) functionality and signaling, and may each be at least partially controlled by the CU 160.

Additionally, or alternatively, a functional split of the protocol stack may be employed between a DU 165 and an RU 170 such that the DU 165 may support one or multiple layers of the protocol stack and the RU 170 may support one or multiple different layers of the protocol stack. The DU 165 may support one or multiple different cells (for example, via one or multiple RUs 170). In some examples, a functional split between a CU 160 and a DU 165, or between a DU 165 and an RU 170 may be within a protocol layer (for example, some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or multiple DUs 165 via a midhaul communication link 162 (for example, F1, F1-c, F1-u), and a DU 165 may be connected to one or multiple RUs 170 via a fronthaul communication link 168 (for example, open fronthaul (FH) interface). In some examples, a midhaul communication link 162 or a fronthaul communication link 168 may be implemented in accordance with an interface (for example, a channel) between layers of a protocol stack supported by respective base stations 105 that are in communication over such communication links.

In the case of the techniques described herein applied in the context of a disaggregated RAN architecture, one or multiple components of the disaggregated RAN architecture may be configured to support precoded PTRS sequence with distributed allocation. For example, some operations described as being performed by a UE 115 or a baes station 105 may additionally, or alternatively, be performed by one or multiple components of the disaggregated RAN architecture (for example, DUs 165, CUs 160, RUs 170, RIC 175, SMO 180).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

One or more of a base station 105 or a UE 115 may precode a PTRS sequence by applying a single DFT to the PTRS sequence. One or more of the base station 105 or the UE 115 may map the DFT precoded PTRS sequence to a subset of resources of a set of resources, and may transmit a signal carrying the DFT precoded PTRS sequence. Alternatively, one or more of the base station 105 or the UE 115 may receive the signal that includes the DFT precoded PTRS sequence and may demap the DFT precoded PTRS sequence to a subset of resources of a set of resources (e.g., a set of PTRS clusters). One or more of a base station 105 or a UE 115 may decode the DFT precoded PTRS by applying a single IDFT to the DFT precoded PTRS sequence, estimate a phase error based at least in part on the decoding, and apply a phase error correction to a plurality of additional symbols associated with the signal based at least in part on the estimated phase error.

Figure 2:
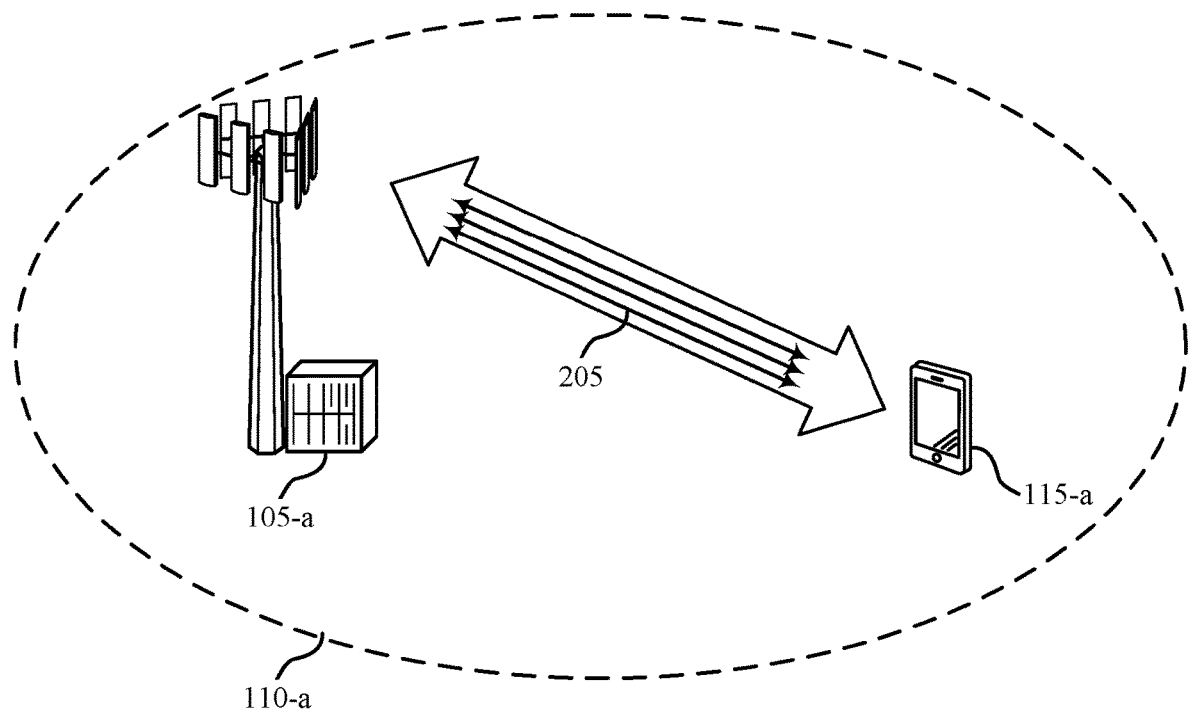

FIG. 2 illustrates an example of a wireless communications system 200 that supports a precoded PTRS sequence with distributed allocation in accordance with various aspects of the present disclosure. In some examples, the wireless communications system 200 may include aspects of the wireless communications system 100. For example, the wireless communications system includes a base station 105-a and a UE 115-a associated with a geographic coverage area 110-a, which may be examples of a base station 105 and a UE 115 as described with reference to FIG. 1. One or more of the base station 105-a or the UE 115-a may be a transmitter communication device. Additionally or alternatively, one or more of the base station 105-a or the UE 115-a may be a receiver communication device.

In the example of FIG. 2, one or more of the base station 105-a or the UE 115-a may transmit a signal 205 including a number of subcarriers. Each subcarrier having a different radio spectrum frequency. One or more of the base station 105-a or the UE 115-a may frequency multiplex symbols by mapping the symbols to different subcarriers with the signal 205. One or more of the base station 105-a or the UE 115-a may perform DFTs and IDFTs for the signal 205. A DFT may transform discrete time data sets into a discrete frequency representation, and an IDFT may transform a discrete frequency representation (e.g., information represented in discrete frequencies) into a discrete time representation (e.g., a digital signal carrying information in the time domain). In some cases, one or more of the base station 105-a or the UE 115-a may precode some symbols according to a DFT, then frequency division multiplex the DFT-precoded symbols with other symbols (e.g., non-DFT-precoded symbols) by mapping the DFT-precoded symbols and the other symbols to different subcarriers of the signal 205. The other symbols may include data, control information, or reference information and may be referred to as data, control, or reference symbols.

One or more of the base station 105-a or the UE 115-a may map at least some of the DFT-precoded symbols to adjacent subcarriers (that is, adjacent frequency tones) of the signal 205. Additionally or alternatively, one or more of the base station 105 a or the UE 115 a may demap at least some of the DFT-precoded symbols from adjacent subcarriers (that is, adjacent frequency tones) of the signal 205 by extracting the DFT-precoded symbols from the subcarriers. In some examples, one or more of the base station 105-a or the UE 115-a may use one or more size-M DFT units (which may also be referred to as M-point DFT units) to generate the DFT-precoded symbols. For example, one or more of the base station 105-a or the UE 115-a may use a single size-M DFT unit to generate M DFT-precoded symbols, and may map the M DFT-precoded symbols to a single set of M adjacent subcarriers of the signal 205, while mapping other symbols to other subcarriers of the signal 205. In some other examples, one or more of the base station 105-a or the UE 115-a may use multiple size-M DFT units to generate multiple sets of M DFT-precoded symbols, and may map each set of M DFT-precoded symbols to a respective set of M adjacent subcarriers, while mapping other symbols to other subcarriers of the signal 205. The other subcarriers may be interposed between sets of M adjacent subcarriers. The number of DFT units used by one or more of the base station 105-a or the UE 115-a to generate DFT-precoded symbols may vary, as may the size of each DFT unit. In the example of FIG. 2, the DFT-precoded symbols may be PTRS symbols. For example, the DFT-precoded symbols may be PTRS symbols that each correspond to a distinct PTRS sequence.

In the example of FIG. 2, one or more of the base station 105-a or the UE 115-a may receive the signal 205 and may estimate a phase error based at least in part on the DFT-precoded symbols. In some cases, one or more of the base station 105-a or the UE 115-a may estimate the phase error with sub-symbol resolution based at least in part on the DFT-precoded symbols carried by adjacent subcarriers. One or more of the base station 105-a or the UE 115-a may apply a phase error correction to the other symbols based at least in part on the estimated phase error. In some cases, one or more of the base station 105-a or the UE 115-a may estimate the phase error, based at least in part, by performing an IDFT of the DFT-precoded symbols to obtain a time domain representation of the DFT-precoded symbols and comparing the time domain representation of the DFT-precoded symbols with a time domain representation of a corresponding set of reference symbols (e.g., symbols of reference PTRS sequences).

The resolution in the time domain with which one or more of the base station 105-a or the UE 115-a may estimate the phase error may relate to the size 'M' of the one or more DFT units used by one or more of the base station 105-a or the UE 115-a to precode the DFT-precoded symbols. In some examples, one or more of the base station 105-a or the UE 115-a may estimate the phase error with a resolution of ¼ of a symbol in the time domain if one or more of the base station 105-a or the UE 115-a uses one or more size-4 DFT units (which may also be referred to as 4-point DFT units). In some other examples, one or more of the base station 105-a or the UE 115-a may estimate the phase error with a resolution of ⅛ of a symbol in the time domain if one or more of the base station 105-a or the UE 115-a uses one or more size-8 DFT units (which may also be referred to as 8-point DFT units).

Figure 3:
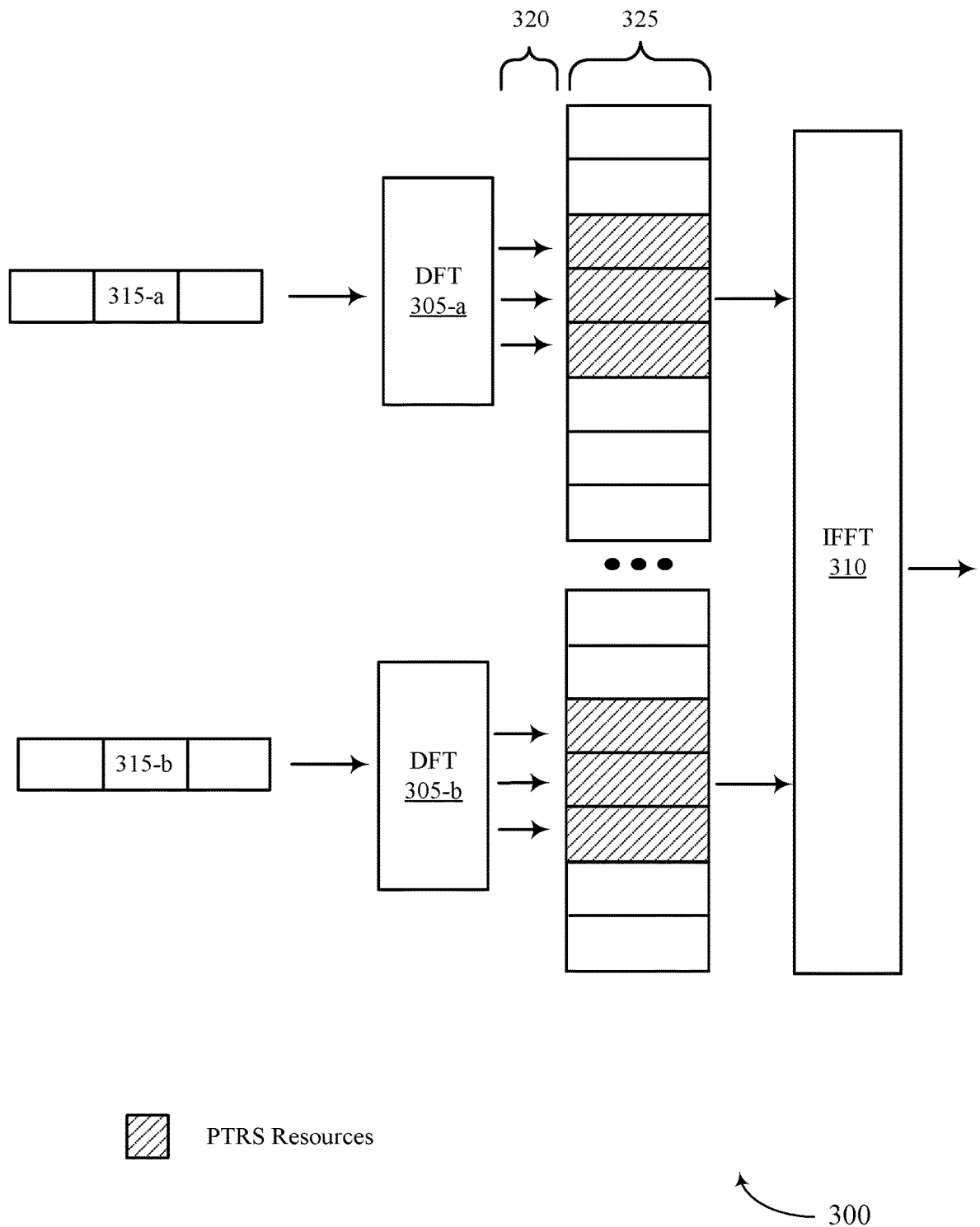
FIG. 3 illustrates an example of a DFT precoding configuration that supports a precoded PTRS sequence with distributed allocation in accordance with aspects of the present disclosure.

FIG. 3 illustrates an example of a DFT-precoding configuration 300 that supports a precoded PTRS sequence with distributed allocation in accordance with various aspects of the present disclosure. The DFT-precoding configuration 300 may implement aspects of the wireless communications systems 100 and 200, or may be implemented by aspects of the wireless communications systems 100 and 200, as described with reference to FIGS. 1 and 2, respectively. For example, the DFT-precoding configuration 300 may be implemented by one or more of a base station 105 or a UE 115. The DFT-precoding configuration 300 may include one or more DFT units 305 (e.g., size-M DFT units) and an inverse fast Fourier transform (IFFT) unit 310. The IFFT unit 310 may be a size-N IDFT unit.

A transmitter communication device (e.g., one or more of a base station 105 or a UE 115) may determine a DFT configuration, which may include determining the number and size of DFT units 305. In the example of FIG. 3, the DFT-precoding configuration 300 includes two DFT units 305. Each DFT unit 305 may be size-M, corresponding to M time domain symbols or M distinct time domain PTRS sequences. Each size-M DFT unit 305 may receive M time domain symbols 315 and may generate and output M DFT-precoded symbols 320. The symbols 315 may be reference signal symbols, such as PTRS symbols. For example, the M symbols 315 may respectively correspond to M distinct time domain PTRS sequences, and each of the M symbols 315 may correspond to a distinct time domain PTRS sequence. Each symbol 315, prior to any DFT-precoding, may be equal to in magnitude to one another, and power for the purpose of phase tracking by a receiving communication device (e.g., one or more of a base station 105 or a UE 115) may be equally distributed in the time domain across an individual symbol.

The DFT units 305 may generate DFT-precoded symbols 320 without executing DFT operations at the time of a transmission. For example, the DFT-precoded symbols 320 may be generated for possible symbols 315 in advance and stored in memory within the transmitter communication device. At the time of a given transmission, a DFT unit 305 may generate DFT-precoded symbols 320 by retrieving from memory a plurality of DFT-precoded symbols 320 that have been computed in advance and associated with the symbols 315 and the operative DFT configuration. For example, the DFT units 305 may access (or consult) a lookup table that associates pre-computed DFT-precoded symbols 320 with the symbols 315 and the operative DFT configuration.

The transmitter communication device may determine a DFT configuration based at least in part on the total number of symbols 315. For example, if the total number of symbols is 'X,' and the total number of DFT units is 'Y,' the transmitter communication device may determine Y and M, such that Y multiplied by M equals X (that is, Y*M=X). The transmitter communication device may also determine Y and M based at least in part on a desired resolution for phase tracking and phase error estimation and based at least in part on noise and fading considerations. For example, a larger value of M may correspond to enhanced resolution for phase tracking and phase error estimation (e.g., M=4 may support phase tracking and phase error estimation in the time domain with a resolution of ¼ of a symbol period, M=8 may support phase tracking and phase error estimation in the time domain with a resolution of ⅛ of a symbol period, and so on). Alternatively, a smaller value of M—and a larger value of Y—may correspond to enhanced robustness to noise and frequency selective fading in a communications channel due to frequency diversity effects, as the use of more DFT units 305 may allow at least some DFT-precoded symbols 320 to be separated from one another in frequency.

In some cases the DFT configuration may be variable, and the transmitter communication device may determine the DFT configuration based at least in part on factors related to characteristics of subcarriers to which the transmitter communication device may map the DFT-precoded symbols 320. For example, the transmitter communication device may determine the DFT configuration based at least in part on one or more of a modulation and coding scheme (MCS), a signal-to-noise ratio (SNR), a phase noise, or a carrier frequency offset (CFO) associated with at least one of the subcarriers to which the transmitter communication device may map the DFT-precoded symbols 320. In some cases, the transmitter communication device may transmit to a target communication device (e.g., one or more of a base station 105 or a UE 115) an indication of the DFT configuration used to generate a given set of DFT-precoded symbols 320. In some cases, the transmitter communication device may receive from a target communication device an indication of a desirable DFT configuration, and the transmitter communication device may use the desirable DFT configuration to generate a given set of DFT-precoded symbols 320.

The transmitter communication device may map the sets of DFT-precoded symbols 320 to corresponding sets of resource elements 325, each set of DFT-precoded symbols 320 corresponding to a distinct DFT unit 305. One or more of the resource elements 325 may be PTRS resources. The adjacent resource elements 325 (e.g., subcarriers) included in the corresponding sets of adjacent resource elements 325 may be adjacent in frequency (e.g., may comprise adjacent tones). The transmitter communication device may map any DFT-precoded symbols 320 generated by a given DFT unit 305 to respective resource elements 325 that are adjacent in frequency. Mapping M DFT-precoded symbols 320 to adjacent resource elements 325 may support phase tracking and phase error estimation in the time domain with a resolution of 1/M of a symbol period, which may, for example, support the use of higher-order modulation techniques.

The transmitter communication device may also map one or more additional symbols, which may be in the frequency domain but not DFT-precoded (e.g., not processed by any DFT unit 305). The additional symbols may be of any symbol type and may, for example, be data symbols, control symbols, or reference signal symbols representing data information, control information, or reference signal information. The transmitter communication device may frequency division multiplex the additional symbols with the DFT-precoded symbols 320. The DFT-precoding configuration 300 may frequency division multiplex the DFT-precoded symbols 320 with other symbols (data symbols, control symbols, or reference symbols) that are not DFT-precoded. For example, if the DFT configuration includes multiple DFT units 305, as in the example of DFT-precoding configuration 300, the transmitter communication device may map at least one additional symbol to a resource element 325 that is between two sets of adjacent resource elements 325 to which the transmitter communication device maps the DFT-precoded symbols 320.

Alternatively, if the DFT configuration includes one DFT unit 305, the transmitter communication device may map at least one additional symbol to a resource element 325 that is adjacent in frequency to a resource element 325 to which the transmitter communication device maps DFT-precoded symbols 320 (e.g., adjacent in frequency to one resource element 325 of a set of adjacent resource elements 325 to which the transmitter communication device maps DFT-precoded symbols 320). The transmitter communication device may seek to distribute sets (e.g., clusters) of adjacent resource elements 325 to which the transmitter communication device maps DFT-precoded symbols 320 so as to support phase tracking and phase error estimation across the total bandwidth spanned by the resource elements 325 and to enhance the frequency diversity of different sets of adjacent resource elements 325 relative to one another.

In some cases, the transmitter communication device may determine the resource elements 325 to which the transmitter communication device maps DFT-precoded symbols 320 based at least in part on channel quality considerations. For example, the transmitter communication device may map the DFT-precoded symbols 320 to resource elements 325 having better channel quality (e.g., lower SNR) relative to other resource elements 325, as this may enhance the ability of a target communication device to perform phase tracking and phase error corrections. In some cases, the transmitter communication device may receive channel quality information (e.g., channel measurement reports) from another communication device, and the transmitter communication device may determine one or more of the resource elements 325 to which the transmitter communication device maps DFT-precoded symbols 320 based at least in part on the channel quality information received from the base station 105. Additionally or alternatively, the transmitter communication device may receive from another communication device one or more signals (e.g., reference signals) based upon which the transmitter communication device may determine channel quality information, and the transmitter communication device may determine one or more of the resource elements 325 to which the transmitter communication device maps DFT-precoded symbols 320 based at least in part on the channel quality information determined by the transmitter communication device.

Channel quality information received or determined by the transmitter communication device may include SNR information for one or more of the resource elements 325. Additionally or alternatively, the transmitter communication device may receive from another communication device an indication of one or more desirable resource elements 325, and the transmitter communication device may map one or more DFT-precoded symbols 320 to the one or more desirable resource elements 325. Also, the transmitter communication device may transmit to a target communication device an indication of the resource elements 325 to which the transmitter communication device maps DFT-precoded symbols 320.

The IFFT unit 310 may receive the resource elements 325 and, in some cases, the additional symbols. In some cases, the IFFT unit 310 may be a size-N IDFT unit. N may be the number of resource elements 325, and the size-N IDFT unit may execute IDFT operations to transform the information mapped to the N resource elements 325 into N corresponding discrete time domain representations (e.g., digital signals carrying information in the time domain). Afterwards, the transmitter communication device may perform additional processing on the time domain representations (e.g., serializing, such as parallel-to-serial conversion, prepending of a cyclic prefix to each time domain symbol, etc.) and may transmit a signal that includes the resource elements 325. Although the operation of DFT-precoding configuration 300 has been described in the context of a single symbol duration, it is to be understood that the example of DFT-precoding configuration 300 and other examples in accordance with various aspects of the present disclosure may repeat for during multiple consecutive or non-consecutive symbol durations.

Figure 4:
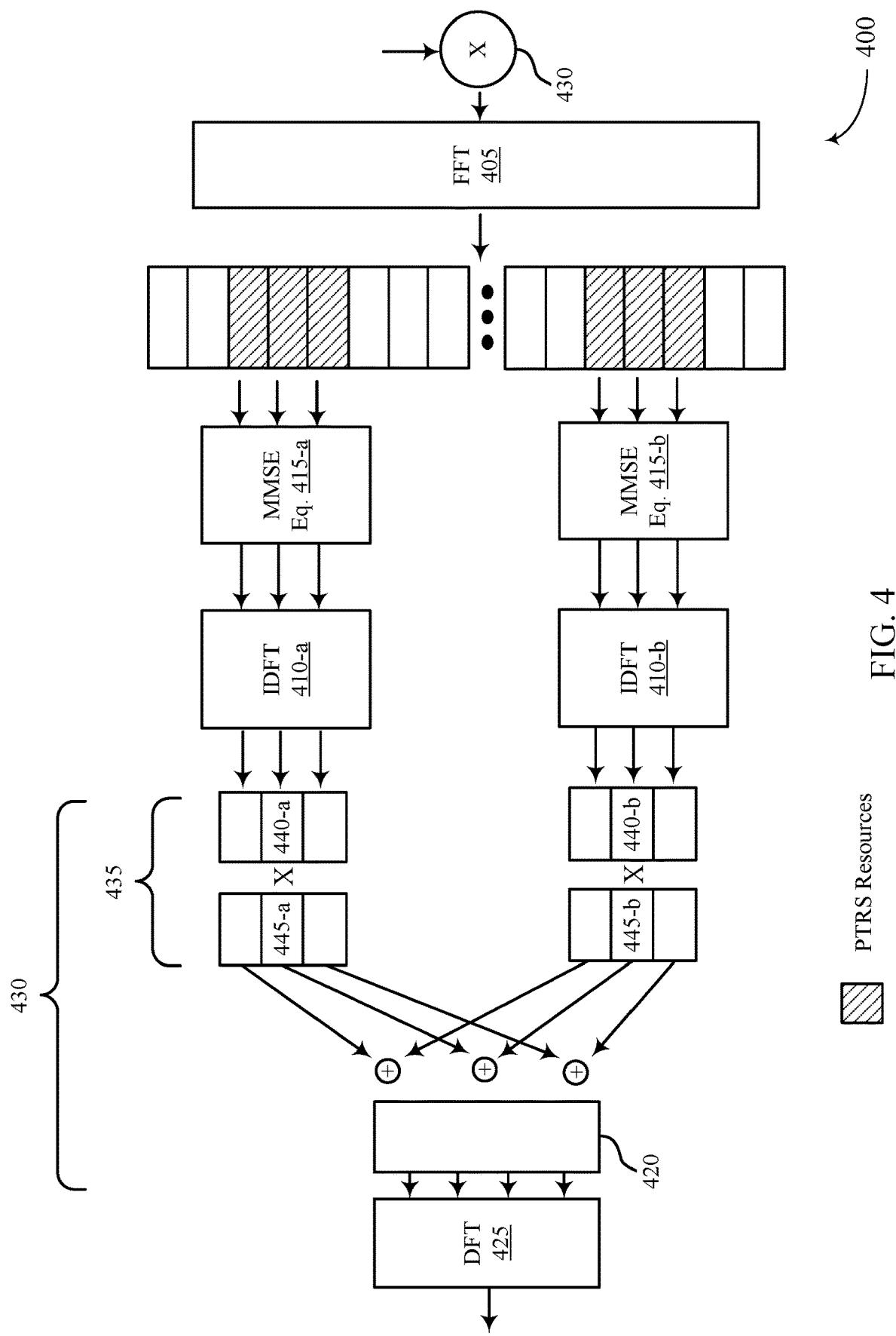
FIG. 4 illustrates an example of a phase error compensation configuration that supports a precoded PTRS sequence with distributed allocation in accordance with aspects of the present disclosure.

FIG. 4 illustrates an example of a phase error compensation configuration 400 that supports a precoded PTRS sequence with distributed allocation in accordance with various aspects of the present disclosure. The phase error compensation configuration 400 may implement aspects of the wireless communications systems 100 and 200, or may be implemented by aspects of the wireless communications systems 100 and 200, as described with reference to FIGS. 1 and 2, respectively. For example, the phase error compensation configuration 400 may be implemented by one or more of a base station 105 or a UE 115. The phase error compensation configuration 400 may include a fast Fourier transform (FFT) 405, which may be a size-N DFT, one or more IDFTs 410 (e.g., size-M IDFTs), one or more minimum mean square error (MMSE) equalization units 415, a phase interpolation unit 420, and a DFT 425.

A receiver communication device (e.g., one or more of a base station 105 or a UE 115) may receive a signal that includes a plurality of resource elements 325 from a transmitter communication device (e.g., one or more of a base station 105 or a UE 115), which may have used the DFT-precoding configuration 300 to process the signal such as the example described in reference to FIG. 3. The receiver communication device may identify a DFT configuration for the DFT-precoded symbols. For example, the receiver communication device may identify a number of DFT units 305 used by the transmitter communication device to precode the DFT-precoded symbols and a size of each DFT unit 305 used to precode the DFT-precoded symbols. In some cases, the receiver communication device may receive from the transmitter communication device an indication of the DFT configuration. In some cases, the receiver communication device may transmit to the transmitter communication device an indication of a desired DFT configuration, and the transmitter communication device may be configured to use the desired DFT configuration or to notify the receiver communication device if it does or does not use the desired DFT configuration.

The receiver communication device may also identify the resource elements 325 that carry the DFT-precoded symbols 320. In some cases, the receiver communication device may receive from the transmitter communication device an indication of the resource elements 325 that carry the DFT-precoded symbols 320. In some cases, the receiver communication device may transmit to the transmitter communication device an indication of one or more desired resource elements 325 for DFT-precoded symbols 320, and the transmitter communication device may be configured to map the DFT-precoded symbols 320 to the preferred resource elements 325 or to notify the receiver communication device if it does or does not map the DFT-precoded symbols 320 to the desired resource elements 325. In some cases, the receiver communication device may determine the desired resource elements 325 based at least in part on one or more associated channel quality metrics, such as SNR.

The receiver communication device may perform some preliminary processing on the signal (e.g., removal of cyclic prefixes, serial-to-parallel conversion, etc.), then process the DFT-precoded symbols 320 based at least in part on the identified DFT configuration to obtain a corresponding plurality of symbols. For example, the receiver communication device may pass a plurality of time domain representations of the received DFT-precoded symbols 320 and, in some cases, the received additional symbols to the FFT 405, where N may be the number of received resource elements 325. In cases where the FFT 405 is a size-N DFT, the size-N DFT may generate N frequency domain representations corresponding to the N time domain representations. For example, the size-N DFT may generate M frequency domain representations of each set of M DFT-precoded symbols 320 corresponding to a DFT 305 and may also generate a frequency domain representation of each additional symbol.

The size-N DFT may pass the M frequency domain representations of each set of M DFT-precoded symbols 320 to a corresponding IDFT 410 (e.g., a size-M IDFT). The receiver communication device may configure the number and size of the IDFT units 410 based on the identified DFT configuration for the DFT-precoded symbols 320 (e.g., the receiver communication device may configure the number and size of the IDFT units 410 to match the number and size of the DFT units 305 used to generate the DFT-precoded symbols 320). Each size-M IDFT 410 may generate a set of M time domain symbols corresponding to each set of M DFT-precoded symbols 320 based on an IDFT algorithm and may output the time domain symbols for phase error estimation.

In some cases, the IDFTs 410 may not execute IDFT operations at the time the DFT-precoded symbols 320 are received. For example, time domain symbols corresponding to the possible DFT-precoded symbols 320 may be generated in advance and stored in memory within the receiver communication device. At the time of a given transmission, an IDFT 410 may generate the time domain symbols by retrieving from memory a plurality of time domain symbols that have been computed in advance and associated with the DFT-precoded symbols 320 and the operative DFT configuration. For example, the units performing the IDFTs 410 may access (or consult) a lookup table that associates the pre-computed time domain symbols with DFT-precoded symbols 320 and the operative DFT configuration.

The IDFTs 410 may output X estimated time domain symbols (e.g., estimated time domain signal or sequence) (where X is the total number of DFT-precoded symbols 320, as described in reference to FIG. 3) and the receiver communication device may estimate one or more phase errors at 430 based at least in part on the X estimated time domain symbols. Estimating phase errors at 430 may include computing one or more phase differences for each IDFT 410 output (e.g., the X estimated time domain symbols) and averaging each phase difference corresponding to each IDFT 410 output corresponding to each resource element cluster (e.g., each PTRS resource cluster). For example, FIG. 4 shows each resource element cluster as including three PTRS resource elements (e.g., which may be adjacent tones) per cluster. Estimating phase errors at 430 may include, for example, retrieving from memory X reference symbols and comparing, at 435, the X estimated time domain symbols to the X reference symbols in the time domain.

In some examples, the receiver communication device may compare, at 435, the X estimated time domain symbols of an estimated time domain signal with PTRS symbols or sequences (e.g., the received PTRS symbols or sequences). For example, the estimated time domain signal and the PTRS symbols or sequences may include sequences 440 and 445, corresponding to estimated complex conjugate $\widehat{A_m^*}$ and sequence $A_m$, respectively). The receiver communication device may be able to determine a phase noise coefficient from the comparison. The receiver communication device may perform a per tap averaging process as a part of the error estimation at 430. As a part of the phase error estimation at 430, the receiver communication device may perform phase interpolation via phase interpolation unit 420 on resource element clusters, where each cluster may correspond to an IDFT 410. In some examples, the phase interpolation unit 420 may output the interpolated phase to the DFT 425, where the receiver communication device may apply a DFT to the interpolated phase. An output of the DFT 425 may be processed by, or help determine, a de-intercarrier-interference (de-ICI) filter.

The receiver communication device may receive an indication from the transmitter communication device of the symbols 315 for which the DFT-precoded symbols 320 were generated and may retrieve from memory reference symbols that correspond to the symbols 315 for which the DFT-precoded symbols 320 were generated. Additionally or alternatively, the receiver communication device may receive an indication from the transmitting device of the reference symbols to use for phase error estimation at 430. In some cases, the plurality of DFT-precoded symbols 320 may correspond to a plurality of PTRS symbols, and the time domain symbols outputted by the IDFTs 410 may be time domain versions of the received PTRS symbols and the reference symbols may be reference PTRS symbols. In some cases, each reference PTRS symbol may be part of a distinct PTRS sequence, and the indication of the reference symbols may indicate the corresponding PTRS sequences.

By comparing the X time domain symbols to the X reference symbols in the time domain, where M DFT-precoded symbols 320 were received via adjacent resource elements 325, the phase error estimation at 430 may support phase tracking and phase error estimation in the time domain with a resolution of 1/M of a symbol period, which may, for example, support the use of higher-order modulation techniques. Generating the DFT-precoded symbols 320, by the transmitter communication device, using a DFT-configuration and symbols 315 that are known to the receiver communication device may support phase tracking and phase error estimation by the receiver communication device. For example, because the receiver communication device may determine which symbols 315 were DFT-precoded and the DFT configuration used to generate the corresponding DFT-precoded symbols, the receiver communication device may be able to determine a corresponding configuration of IDFTs 410 and a corresponding set of reference symbols, and may support the validity of the comparison of time domain symbols to reference symbols by the phase error estimation at 430. DFT-precoding of the DFT-precoded symbols 320 may ensure that power in the time domain is equally distributed within each of the time domain symbols, which may further support the validity of the comparison of the time domain symbols to the reference symbols by the phase error estimation at 430.

The receiver communication device may perform the phase error estimation at 430 to compute a phase error trajectory based on the comparison of the outputted time domain symbols to the reference symbols. The phase error trajectory may include a trajectory of phase error across the bandwidth of the signal (e.g., across the frequencies corresponding to the received resource elements 325), as a phase error may be computed for multiple subcarriers via which DFT-precoded symbols 320 were received, and a phase error for one or more other resource elements 325 at other frequencies may be extrapolated or interpolated therefrom, as applicable. In some cases, the receiver communication device may apply a phase correction (e.g., a phase adjustment) to the frequency domain representation of one or more of the additional symbols based at least in part on the computed (e.g., estimated) phase error at 430 or at a portion of 430. Although operation of the phase error compensation configuration 400 may be able to be described in the context of a single symbol duration, it is to be understood that the example of phase error compensation configuration 400 and other examples in accordance with various aspects of the present disclosure may repeat during multiple consecutive or non-consecutive symbol durations.

Figure 5:
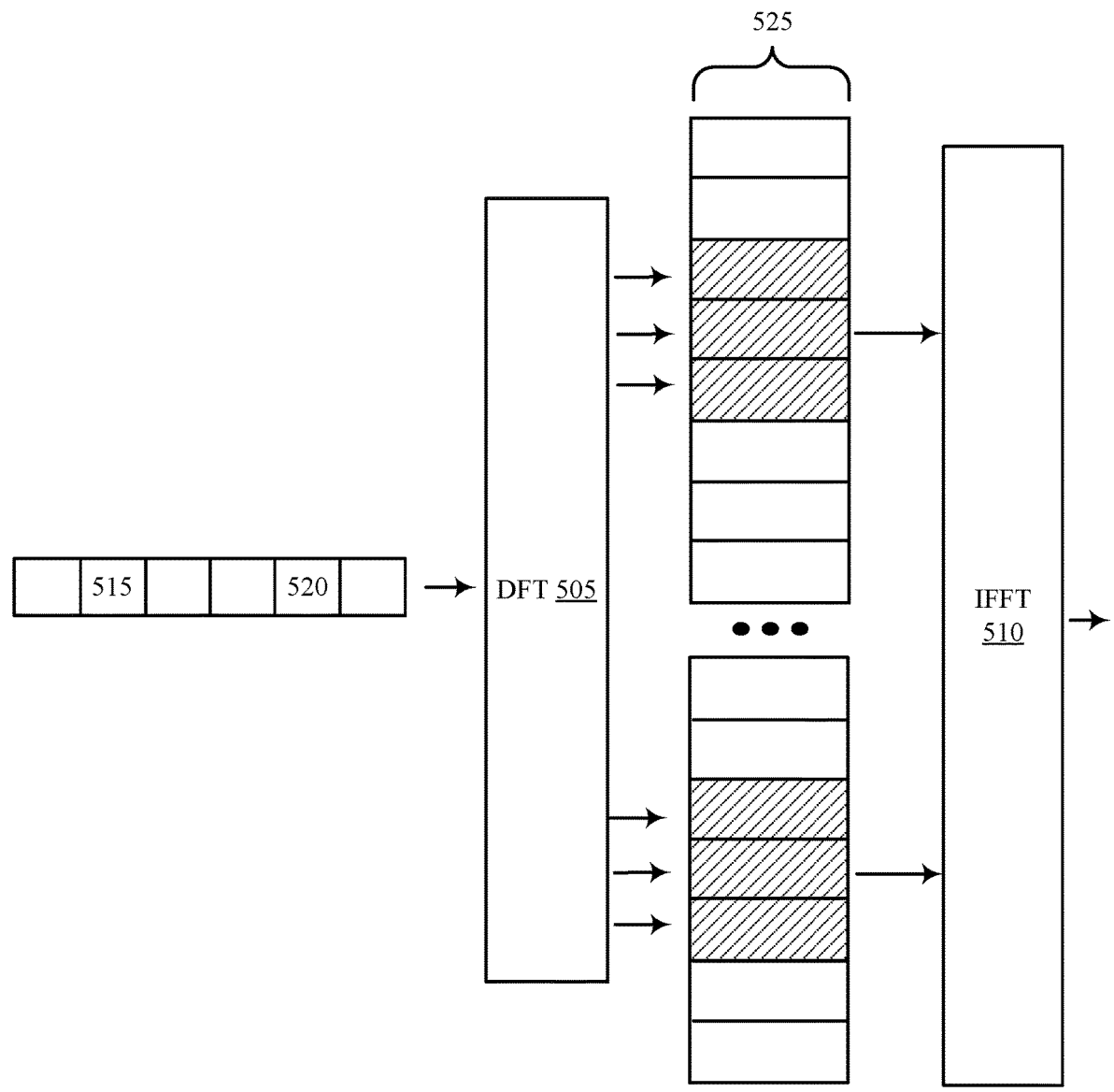
FIG. 5 illustrates an example of a single DFT-precoding configuration that supports a precoded PTRS sequence with distributed allocation in accordance with aspects of the present disclosure.

FIG. 5 illustrates an example of a single DFT-precoding configuration 500 that supports a precoded PTRS sequence with distributed allocation in accordance with various aspects of the present disclosure. The single DFT-precoding configuration 500 may implement aspects of the wireless communications systems 100 and 200, or may be implemented by aspects of the wireless communications systems 100 and 200, as described with reference to FIGS. 1 and 2, respectively. For example, the single DFT-precoding configuration 500 may be implemented by one or more of a base station 105 or a UE 115. The single DFT-precoding configuration 500 may include one or more aspects of the DFT-precoding configuration 300. The single DFT-precoding configuration 500 may include a DFT 505 and an IFFT 510. In some examples, the IFFT 510 may be an IDFT.

A transmitter communication device (e.g., one or more of a base station 105 or a UE 115) may precode one or more PTRS sequences by performing one DFT 505 on the one or more PTRS sequences (e.g., a sequence 515, a sequence 520, which may be represented as $A_m$ and $A_n$, respectively). The one or more PTRS sequences may include one or more symbols. The DFT 505 may output and map the one or more precoded PTRS sequences to one or more distributed clusters of resource elements 525 (e.g., PTRS resource elements). As a part of the mapping process, the transmitter communication device may insert one or more guard tones adjacent to each cluster of one or more PTRS resource elements, as described with further detail at FIG. 7.

In some examples, the DFT 505 may include one or more DFT operations, and the quantity of DFT operations for the DFT 505 may be less than the quantity of clusters of the resource elements 525. The resource elements 525 may be frequency tones. Each cluster of resource elements 525 may include three resource elements 525, or M resource elements 525, or some other quantity of resource elements 525. The quantity M may represent the quantity of PTRS sequences. The cluster size (e.g., quantity of resource elements 525 per cluster) may be configurable. For example, the transmitter communication device may receive control signaling (e.g., RRC signaling, a downlink control information (DCI) message, a MAC control element (MAC-CE)) indicating the size of the clusters of the resource elements 525. In some other examples, the transmitter communication device itself may configure the cluster size. In some examples, the transmitter communication device may perform the IFFT 510, which may be an IDFT, on the one or more PTRS sequences mapped to the resource elements 525 in each cluster. The transmitter communication device may then transmit a signal including the one or more PTRS sequences.

Figure 6:
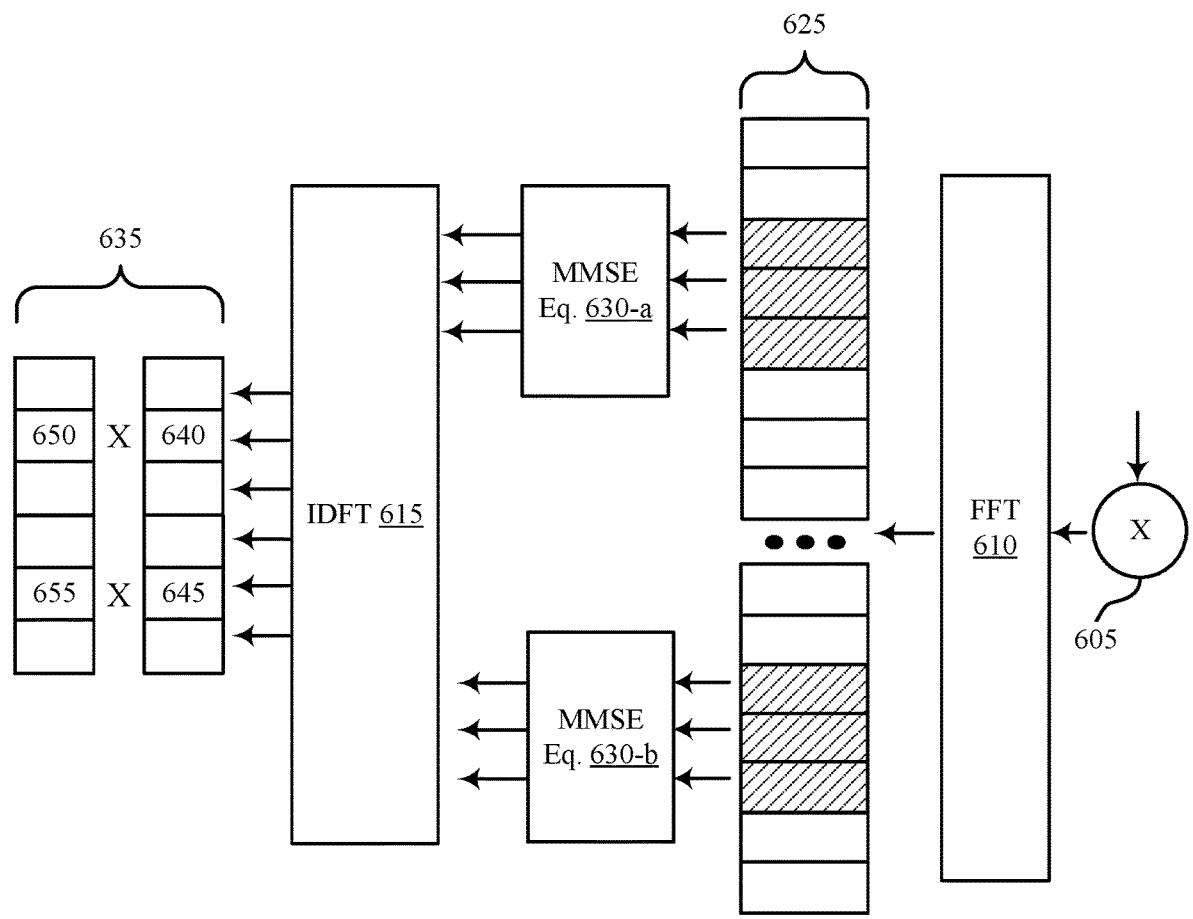
FIG. 6 illustrates an example of a single-IDFT phase error compensation configuration that supports a precoded PTRS sequence with distributed allocation in accordance with aspects of the present disclosure.

FIG. 6 illustrates an example of a single-IDFT phase error compensation configuration 600 that supports a precoded PTRS sequence with distributed allocation in accordance with various aspects of the present disclosure. The single-IDFT phase error compensation configuration 600 may implement aspects of the wireless communications systems 100 and 200, or may be implemented by aspects of the wireless communications systems 100 and 200, as described with reference to FIGS. 1 and 2, respectively. For example, the single-IDFT phase error compensation configuration 600 may be implemented by one or more of a base station 105 or a UE 115. The single-IDFT phase error compensation configuration 600 may implement or be implemented by aspects of the phase error compensation configuration 400. The single-IDFT phase error compensation configuration 600 may include a receiving component 605, an FFT 610, which may be a DFT, an IDFT 615, and one or more MMSE equalization units 620.

A receiver communication device (e.g., one or more of a base station 105 or a UE 115) may, via the receiving component 605, receive a signal including one or more PTRS sequences (e.g., DFT-precoded PTRS sequences). The one or more DFT-precoded PTRS sequences may include one or more DFT-precoded symbols. The receiving component 605 may output the one or more DFT-precoded PTRS sequences for processing by the FFT 610. The receiver communication device may demap the one or more sequences to one or more resource elements 625 (e.g., PTRS resource elements) included in one or more clusters. The receiver communication device may demap one or more DFT-precoded symbols by extracting the precoded symbols from the one or more resource elements 625 (e.g., PTRS resource elements). In some examples, the one or more resource elements 625 may be referred to as frequency tones. The cluster size (e.g., quantity of resource elements 625 per cluster) may be configurable. For example, the receiver communication device may receive control signaling (e.g., RRC signaling, a DCI message, or a MAC-CE) indicating the size of the clusters of resource elements 625. In some other examples, the receiver communication device itself may configure the cluster size.

After the demapping, the receiver communication device may extract the PTRS resource elements and may perform one or more MMSE equalizations 630 on one or more of the demapped PTRS sequences. In some examples, each cluster of resource elements may correspond to respective MMSE equalizations 630 (e.g., MMSE equalization 630-a, MMSE equalization 630-b). After performing the one or more MMSE equalizations 630, the receiver communication device may perform a single IDFT 615 on the one or more PTRS sequences. That is, the single IDFT 615 may process each output of each MMSE equalization 630 corresponding to each cluster of resource elements 625. In some cases, the single IDFT 615 may include one or more IDFT operations, a quantity of operations that may be less than a quantity of the one or more clusters of the one or more resource elements 625.

The single IDFT 615 may output an estimated time domain signal, and, at 635, the receiver communication device may compare the estimated time domain signal (e.g., which may include sequences 640 and 645, corresponding to estimated complex conjugate $\widehat{A_m^*}$ and estimated complex conjugate $\widehat{A_n^*}$, respectively) to the received signal including the one or more PTRS sequences (e.g., including sequences 650 and 655, corresponding to $A_m$ and $A_n$, respectively). The comparison at 635 may output or otherwise enable the receiver communication device to determine a phase compensation filter. The comparison at 635 may also enable the receiver communication device to estimate a phase error and apply a phase error correction to the received signal (e.g., one or more additional symbols of the received signal) including the one or more PTRS sequences. In some cases, estimating the phase error may include determining a phase noise coefficient for use in applying the phase error correction.

Figure 7:
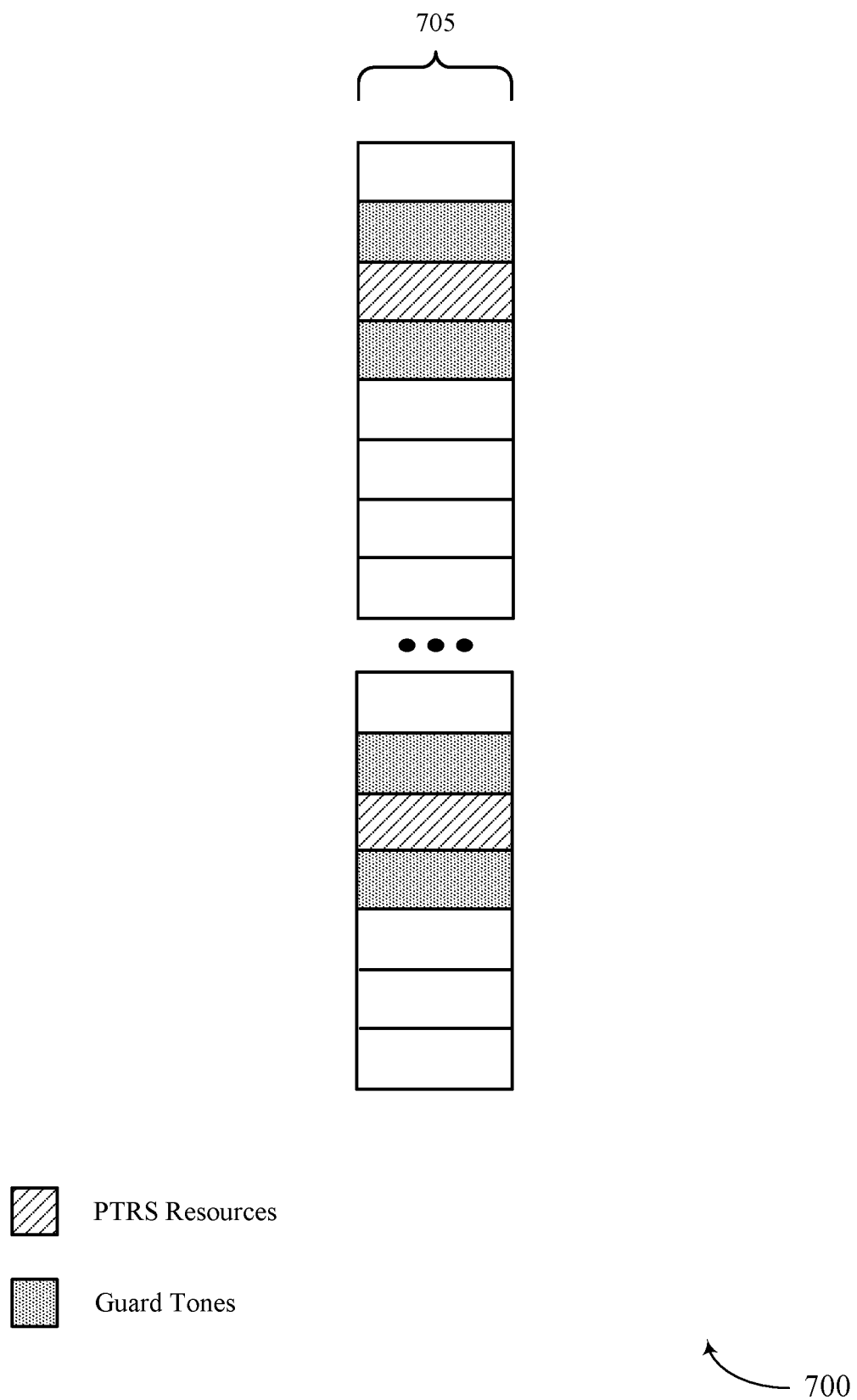
FIG. 7 illustrates an example of resources including guard tones that support a precoded PTRS sequence with distributed allocation in accordance with aspects of the present disclosure.

FIG. 7 illustrates an example of resources 700 that support a precoded PTRS sequence with distributed allocation in accordance with various aspects of the present disclosure.

The resources 700 may implement aspects of the wireless communications systems 100 and 200, or may be implemented by aspects of the wireless communications systems 100 and 200, as described with reference to FIGS. 1 and 2, respectively. For example, the resources 700 may be implemented or used by one or more of a base station 105 or a UE 115. The resources 700 may include one or more resource elements 705, which may be one or more clusters of one or more PTRS resource elements. The resource elements 705 may include one or more guard tones adjacent to the one or more clusters.

In cases where a cluster size is one (e.g., one PTRS resource element) or some other size, or where the PTRS is in an interleaved frequency division multiple access (IF-DMA) waveform, or both, a transmitter communication device (e.g. one or more of a base station 105 or a UE 115) may insert one or more guard tones adjacent to the one or more PTRS resource elements. For example, the transmitter communication device may first identify a quantity of tones for the PTRS (e.g., according to K=¾), and may generate one or more PTRS sequences in the time domain. According to one or more aspects of FIG. 5, the transmitter communication device may perform the DFT 505 on the one or more PTRS sequences, and may then fill one or more of the resource elements 525 with PTRS resources in the frequency domain (e.g., map the one or more PTRS sequences to one or more resource elements 525 forming one or more clusters).

In some examples, the transmitter communication device may leave gaps (e.g., for guard tones) around each cluster of PTRS resource elements, where each cluster of one or more PTRS resource elements may have two adjacent guard tones, four, six, or some other quantity of adjacent guard tones. The gaps, which may include the guard tones, may determine or indicate one or more repetitions of a transmitted signal (e.g., the one or more PTRS sequences of the signal, or the entire signal) by the transmitter communication device in the time domain. With reference to FIG. 5, the transmitter communication device may perform IFFT 510 for the transmission. The transmitter communication device may transmit the signal (e.g., with repetitions or without repetitions) including the one or more PTRS sequences and one or more guard tones, where the PTRS portions of the transmission may be a frequency domain comb. In some examples, the resulting waveform of the signal may be a frequency division multiplexing FDM of PTRS resources and other data resources. In some examples, the FDM of the resources may be interlace based. In some cases, the transmitter communication device may receive control signaling indicating the one or more (e.g., quantity of) guard tones to be inserted adjacent to the one or more PTRS resource elements (e.g., via RRC signaling, a DCI message, or a MAC-CE).

In some examples, a receiver communication device (e.g., one or more of a base station 105 or a UE 115) may operate according to one or more features with respect to FIG. 6. For example, the receiver communication device may perform FFT 610 upon receiving the signal. If the signal includes guard tones adjacent to PTRS resources, the receiving device may detect the guard tones and may null one or more data resources (e.g., tones) while not nulling the PTRS resources (e.g., tones) and not nulling the guard tones. In some cases, the one or more guard tones may catch ICI, which may otherwise reduce the performance of some transmissions. The receiver communication device may perform a single IFFT, which in some cases may be a single IDFT 615, on one or more symbols. For example, the receiver communication device may perform the single IFFT on non-PTRS symbols and non-zero power resources (e.g., the guard tones). As there may be time-varying phase noise for each signal repetition, the receiving device may estimate a time domain phase noise by, for example, comparing the phase of different signal repetitions.

Figure 8:
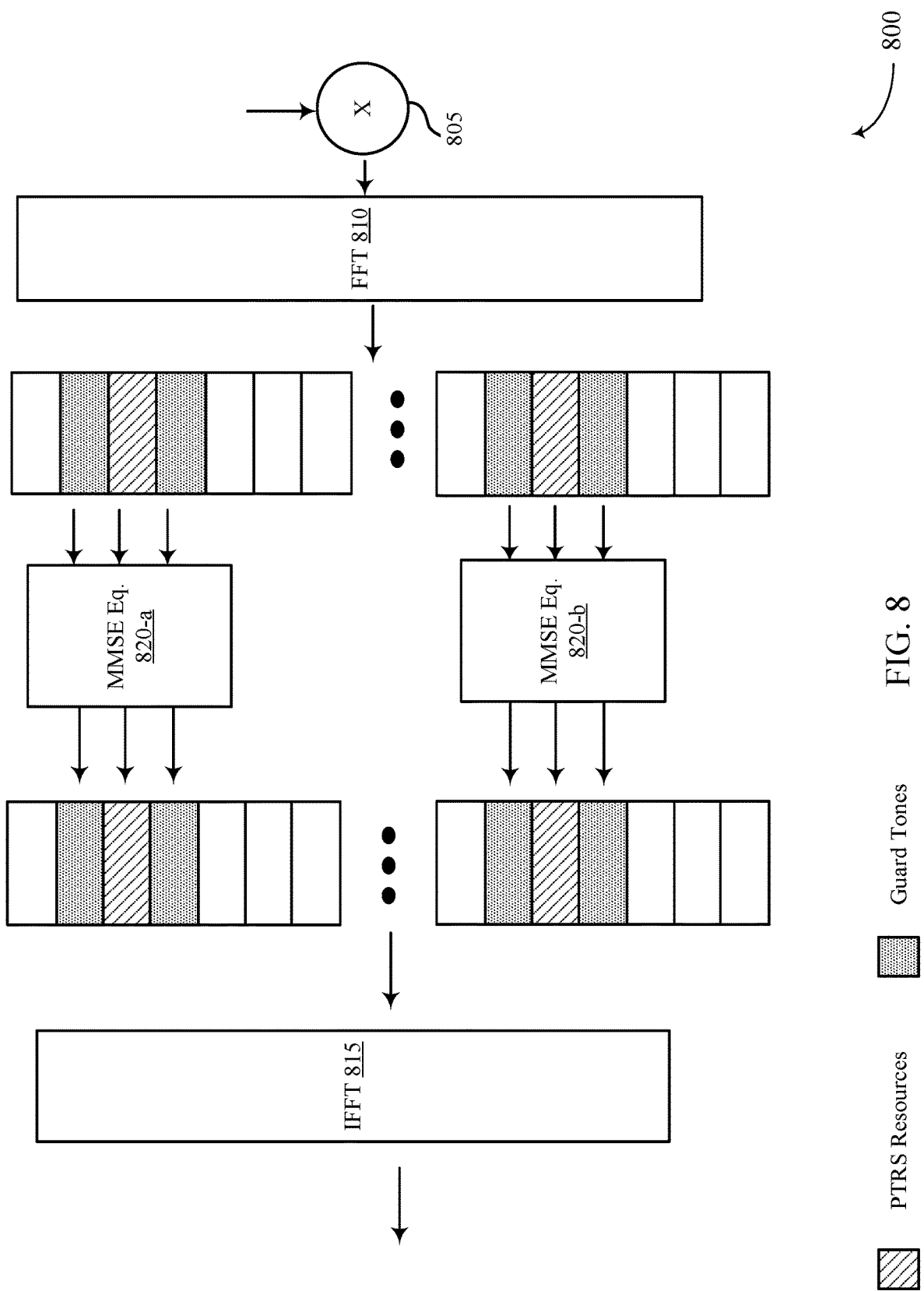
FIG. 8 illustrates an example of a single-IDFT phase error compensation configuration with guard tones that support a precoded PTRS sequence with distributed allocation in accordance with aspects of the present disclosure.

FIG. 8 illustrates an example of a single-IDFT phase error compensation configuration 800 with guard tones that support a precoded PTRS sequence with distributed allocation in accordance with various aspects of the present disclosure. In some examples, the single-IDFT phase error compensation configuration 800 may implement aspects of the wireless communications systems 100 and 200, or may be implemented by aspects of the wireless communications systems 100 and 200, as described with reference to FIGS. 1 and 2, respectively. For example, the single-IDFT phase error compensation configuration 800 may be implemented or used by one or more of a base station 105 or a UE 115. The single-IDFT phase error compensation configuration 800 may implement or may be implemented by aspects of the single-IDFT phase error compensation configuration 600.

The single-IDFT phase error compensation configuration 800 may include a receiving component 805, an FFT 810, which may be a DFT, an IFFT 815, which may be an IDFT, and one or more MMSE equalization units 820 (e.g., MMSE equalization unit 820-a, MMSE equalization unit 820-b). In some cases, the guard tones of the single-IDFT phase error compensation configuration 800 may implement or may be implemented by aspects of the guard tones as described with reference to FIG. 7. In some cases, the single-IDFT phase error compensation configuration 800 may be similar in functionality to the single-IDFT phase error compensation configuration 600, with guard tones detected and adjacent to one or more PTRS resources for each cluster in the single-IDFT phase error compensation configuration 800. In scenarios where a receiver communication device detects one or more guard tones, after performing the IFFT 815, the receiver communication device may determine one or more estimates of a phase in the time domain. The receiver communication device may perform a phase interpolation procedure (e.g., which may be similar to the phase interpolation unit 420 with reference to FIG. 4) for estimating a phase noise (e.g., error).

Figure 9:
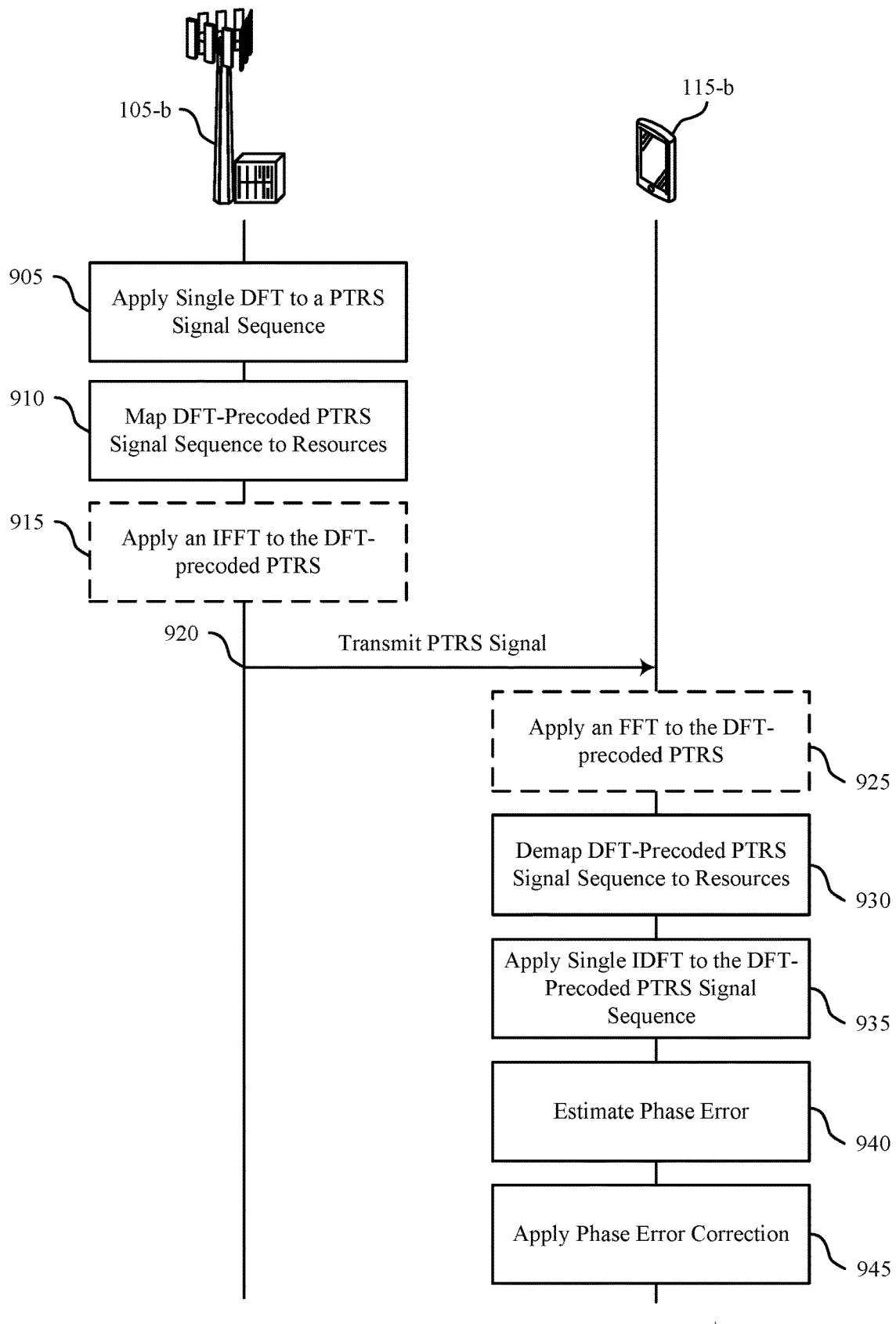
FIG. 9 illustrates an example of a process flow that supports a precoded PTRS sequence with distributed allocation in accordance with aspects of the present disclosure.

FIG. 9 illustrates an example of a process flow 900 that supports a precoded PTRS sequence with distributed allocation in accordance with aspects of the present disclosure. The process flow 900 may implement aspects of the wireless communications system 100, the wireless communications system 200, or both, or may be implemented by aspects of the wireless communications system 100, the wireless communications system 200, or both, as described with reference to FIG. 1 and FIG. 2. In some examples, the process flow 900 may include example operations or aspects associated with one or more of FIGS. 3-8. In the following description of the process flow 900, the operations between a transmitter communication device (e.g., a base station 105-b) and a receiver communication device (e.g., a UE 115-b) may be performed in different orders or at different times. Some operations may also be omitted from the process flow 900, and other operations may be added to the process flow 900.

At 905, the base station 105-b may precode a PTRS sequence by applying a single DFT to the PTRS sequence, the DFT precoded PTRS sequence including a DFT precoded plurality of symbols. In some examples, a number of DFT operations associated with the single DFT is less than a number of PTRS resource clusters. At 910, the base station 105-b may map the DFT precoded PTRS sequence to a subset of resources of a set of resources, the subset of resources including one or more PTRS resource elements. In some examples, the base station 105-b may insert one or more guard tones adjacent to the subset of resources of the set of resources, the subset of resources including the one or more PTRS resource elements. In some examples, the base station 105-b may map the DFT precoded PTRS sequence to one or more subsets of resources of the set of resources, each subset of resources including the one or more PTRS resource elements.

At 915, the base station 105-b may apply an IFFT to the mapped DFT precoded PTRS sequence. In some examples, the base station 105-b may apply the IFFT to the PTRS sequence mapped to one or more resource elements in one or more clusters. At 920, the base station 105-b may transmit a signal carrying the DFT precoded PTRS sequence, and the UE 115-b may receive the signal that includes the DFT precoded PTRS sequence, the DFT precoded PTRS sequence including a DFT precoded plurality of symbols. At 925, the UE 115-b may apply an FFT to the received signal that includes the DFT precoded PTRS.

At 930, the UE 115-b may demap the DFT precoded PTRS sequence to a subset of resources of a set of resources, the subset of resources including one or more PTRS resource elements. For example, the UE 115-b may demap one or more DFT-precoded symbols by extracting DFT precoded symbols from the subset of resources (e.g., PTRS resource elements). In some examples, the UE 115-b may demap the DFT precoded PTRS sequence including the DFT precoded plurality of symbols to one or more subsets of resources of the set of resources, each subset of resources including the one or more PTRS resource elements. At 935, the UE 115-b may decode the DFT precoded PTRS by applying a single IDFT to the DFT precoded PTRS sequence. In some examples, a number of IDFT operations associated with the single IDFT is less than a number of PTRS resource clusters. In some cases, the single IDFT may process outputs of each MMSE equalization processes corresponding to the PTRS resource clusters of resource elements. In some examples, the single IDFT may output an estimated time domain signal.

At 940, the UE 115-b may estimate a phase error based on the decoding. In some examples, the UE 115-b may compare the estimated time domain signal to the received signal that includes the DFT precoded PTRS sequence. In some examples, the UE 115-b may determine a phase noise coefficient as part of estimating the phase error. In some examples, the UE 115-b may estimate the phase error with sub-symbol resolution based on DFT-precoded symbols carried by adjacent subcarriers. At 945, the UE 115-b may apply a phase error correction to one or more additional symbols associated with the signal based on the estimated phase error. In some examples, the UE 115-b may apply the phase error correction to the other symbols based on the estimated phase error.

Figure 10:
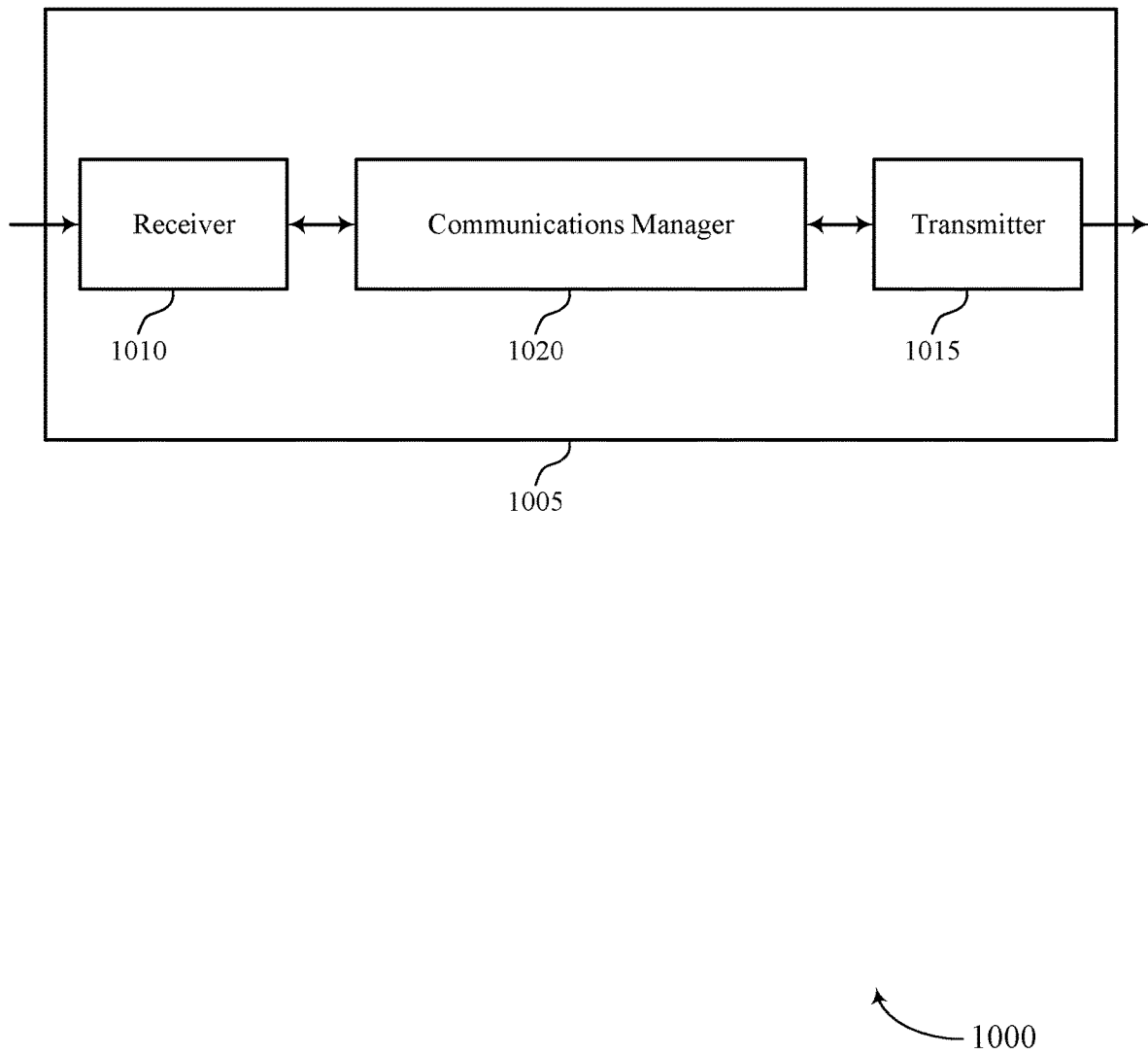
FIGS. 10 and 11 show block diagrams of devices that support a precoded PTRS sequence with distributed allocation in accordance with aspects of the present disclosure.

FIG. 10 shows a block diagram 1000 of a device 1005 that supports a precoded PTRS sequence with distributed allocation in accordance with aspects of the present disclosure. The device 1005 may be an example of aspects of one or more of a base station 105 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to precoded PTRS sequence with distributed allocation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to precoded PTRS sequence with distributed allocation). In some examples, the transmitter 1015 may be co-located with a receiver 1010 in a transceiver unit. The transmitter 1015 may utilize a single antenna or a set of multiple antennas.

The communications manager 1020, the receiver 1010, the transmitter 1015, or various combinations thereof or various components thereof may be examples of means for performing various aspects of precoded PTRS sequence with distributed allocation as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), an application specific integrated circuit (ASIC), a field programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication in accordance with examples as disclosed herein. For example, the communications manager 1020 may be configured as or otherwise support a means for receiving a signal that includes a DFT precoded PTRS sequence, the DFT precoded PTRS sequence including a DFT precoded set of multiple symbols. The communications manager 1020 may be configured as or otherwise support a means for demapping the DFT precoded PTRS sequence to a subset of resources of a set of resources, the subset of resources including one or more PTRS resource elements. The communications manager 1020 may be configured as or otherwise support a means for decoding the DFT precoded PTRS by applying a single inverse DFT to the DFT precoded PTRS sequence. The communications manager 1020 may be configured as or otherwise support a means for estimating a phase error based on the decoding. The communications manager 1020 may be configured as or otherwise support a means for applying a phase error correction to a set of multiple additional symbols associated with the signal based on the estimated phase error.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for reduced processing, reduced power consumption, and more efficient utilization of communication resources.

Figure 11:
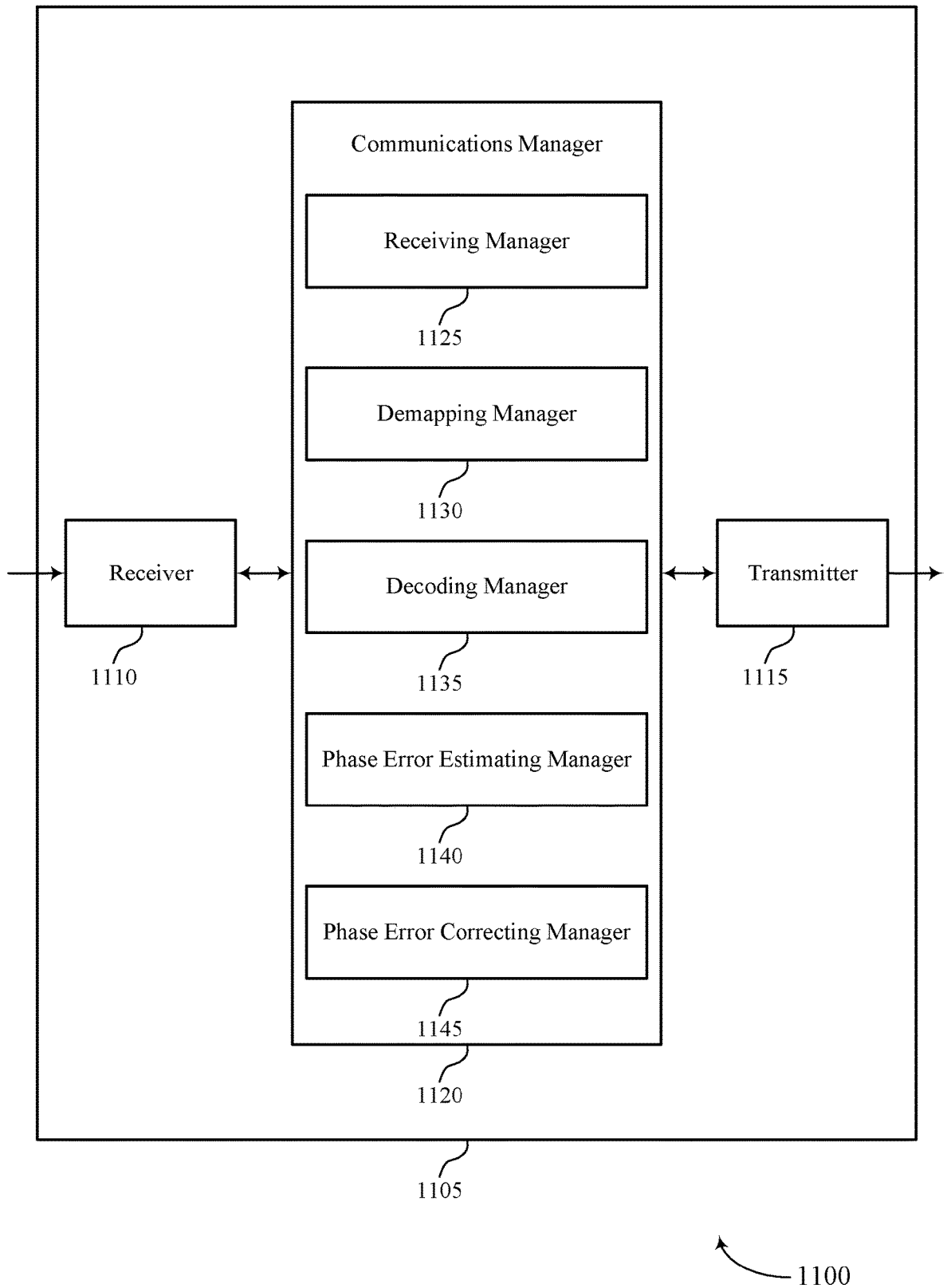

FIG. 11 shows a block diagram 1100 of a device 1105 that supports a precoded PTRS sequence with distributed allocation in accordance with aspects of the present disclosure. The device 1105 may be an example of aspects of a device 1005 or one or more of a base station 105 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to precoded PTRS sequence with distributed allocation). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to precoded PTRS sequence with distributed allocation). In some examples, the transmitter 1115 may be co-located with a receiver 1110 in a transceiver unit. The transmitter 1115 may utilize a single antenna or a set of multiple antennas.

The device 1105, or various components thereof, may be an example of means for performing various aspects of precoded PTRS sequence with distributed allocation as described herein. For example, the communications manager 1120 may include a receiving manager 1125, a demapping manager 1130, a decoding manager 1135, a phase error estimating manager 1140, a phase error correcting manager 1145, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication in accordance with examples as disclosed herein. The receiving manager 1125 may be configured as or otherwise support a means for receiving a signal that includes a DFT precoded PTRS sequence, the DFT precoded PTRS sequence including a DFT precoded set of multiple symbols. The demapping manager 1130 may be configured as or otherwise support a means for demapping the DFT precoded PTRS sequence to a subset of resources of a set of resources, the subset of resources including one or more PTRS resource elements. The decoding manager 1135 may be configured as or otherwise support a means for decoding the DFT precoded PTRS by applying a single inverse DFT to the DFT precoded PTRS sequence. The phase error estimating manager 1140 may be configured as or otherwise support a means for estimating a phase error based on the decoding. The phase error correcting manager 1145 may be configured as or otherwise support a means for applying a phase error correction to a set of multiple additional symbols associated with the signal based on the estimated phase error.

Figure 12:
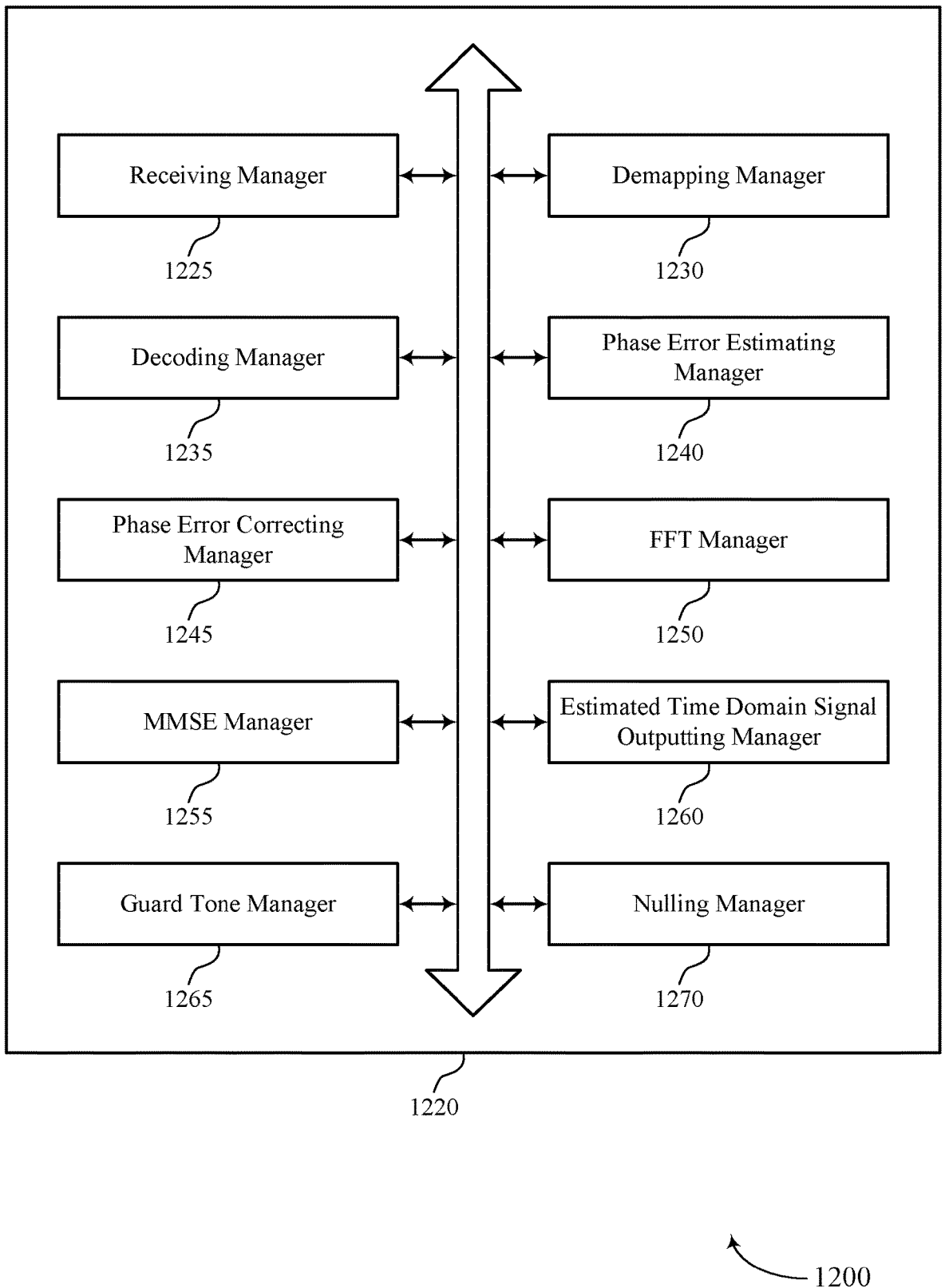
FIG. 12 shows a block diagram of a communications manager that supports a precoded PTRS sequence with distributed allocation in accordance with aspects of the present disclosure.

FIG. 12 shows a block diagram 1200 of a communications manager 1220 that supports a precoded PTRS sequence with distributed allocation in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of precoded PTRS sequence with distributed allocation as described herein. For example, the communications manager 1220 may include a receiving manager 1225, a demapping manager 1230, a decoding manager 1235, a phase error estimating manager 1240, a phase error correcting manager 1245, an FFT manager 1250, an MMSE manager 1255, an estimated time domain signal outputting manager 1260, a guard tone manager 1265, a nulling manager 1270, or any combination thereof. Each of these components may communicate, directly or indirectly, with one another (e.g., via one or more buses).

The communications manager 1220 may support wireless communication in accordance with examples as disclosed herein. The receiving manager 1225 may be configured as or otherwise support a means for receiving a signal that includes a DFT precoded PTRS sequence, the DFT precoded PTRS sequence including a DFT precoded set of multiple symbols. The demapping manager 1230 may be configured as or otherwise support a means for demapping the DFT precoded PTRS sequence to a subset of resources of a set of resources, the subset of resources including one or more PTRS resource elements. The decoding manager 1235 may be configured as or otherwise support a means for decoding the DFT precoded PTRS by applying a single inverse DFT to the DFT precoded PTRS sequence. The phase error estimating manager 1240 may be configured as or otherwise support a means for estimating a phase error based on the decoding. The phase error correcting manager 1245 may be configured as or otherwise support a means for applying a phase error correction to a set of multiple additional symbols associated with the signal based on the estimated phase error.

In some examples, a number of inverse DFT operations associated with the single inverse DFT is less than a number of PTRS resource clusters. In some examples, the FFT manager 1250 may be configured as or otherwise support a means for applying an FFT to the received signal that includes the DFT precoded PTRS. In some examples, the MMSE manager 1255 may be configured as or otherwise support a means for applying an MMSE equalization to a portion of the demapped DFT precoded PTRS sequence. In some examples, the estimated time domain signal outputting manager 1260 may be configured as or otherwise support a means for outputting an estimated time domain signal based on decoding the DFT precoded PTRS. In some examples, to support estimating the phase error, the phase error estimating manager 1240 may be configured as or otherwise support a means for comparing the estimated time domain signal to the received signal that includes the DFT precoded PTRS sequence. In some examples, to support estimating the phase error, the phase error estimating manager 1240 may be configured as or otherwise support a means for determining a phase noise coefficient.

In some examples, the guard tone manager 1265 may be configured as or otherwise support a means for determining a set of guard tones adjacent to a set of PTRS tones. In some examples, the nulling manager 1270 may be configured as or otherwise support a means for nulling a set of data tones. In some examples, the nulling manager 1270 may be configured as or otherwise support a means for refraining from nulling one or more of the set of guard tones or the set of PTRS tones. In some examples, to support demapping the DFT precoded PTRS sequence, the demapping manager 1230 may be configured as or otherwise support a means for demapping the DFT precoded PTRS sequence including the DFT precoded set of multiple symbols to a set of multiple subsets of resources of the set of resources, each subset of resources including the one or more PTRS resource elements.

Figure 13:
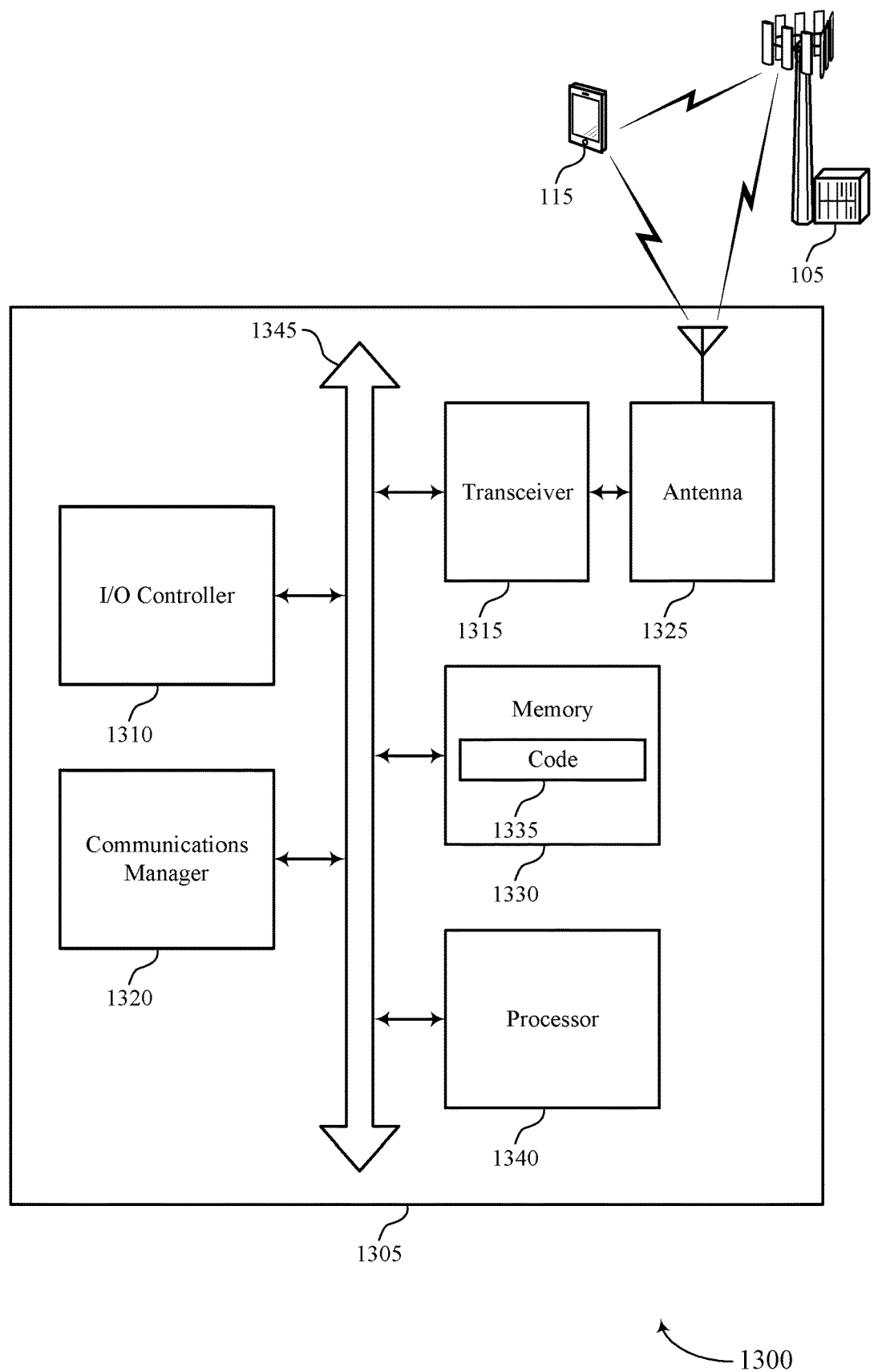
FIG. 13 shows a diagram of a system including a device that supports a precoded PTRS sequence with distributed allocation in accordance with aspects of the present disclosure.

FIG. 13 shows a diagram of a system 1300 including a device 1305 that supports a precoded PTRS sequence with distributed allocation in accordance with aspects of the present disclosure. The device 1305 may be an example of or include the components of a device 1005, a device 1105, or one or more of a base station 105 or a UE 115 as described herein. The device 1305 may include components for bi-directional voice and data communications including components for transmitting and receiving communications, such as a communications manager 1320, an I/O controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic input/output system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting precoded PTRS sequence with distributed allocation). For example, the device 1305 or a component of the device 1305 may include a processor 1340 and memory 1330 coupled to the processor 1340, the processor 1340 and memory 1330 configured to perform various functions described herein.

The communications manager 1320 may support wireless communication in accordance with examples as disclosed herein. For example, the communications manager 1320 may be configured as or otherwise support a means for receiving a signal that includes a DFT precoded PTRS sequence, the DFT precoded PTRS sequence including a DFT precoded set of multiple symbols. The communications manager 1320 may be configured as or otherwise support a means for demapping the DFT precoded PTRS sequence to a subset of resources of a set of resources, the subset of resources including one or more PTRS resource elements.

The communications manager 1320 may be configured as or otherwise support a means for decoding the DFT precoded PTRS by applying a single inverse DFT to the DFT precoded PTRS sequence. The communications manager 1320 may be configured as or otherwise support a means for estimating a phase error based on the decoding. The communications manager 1320 may be configured as or otherwise support a means for applying a phase error correction to a set of multiple additional symbols associated with the signal based on the estimated phase error.

By including or configuring the communications manager 1320 in accordance with examples as described herein, the device 1305 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of precoded PTRS sequence with distributed allocation as described herein, or the processor 1340 and the memory 1330 may be otherwise configured to perform or support such operations.

Figure 14:
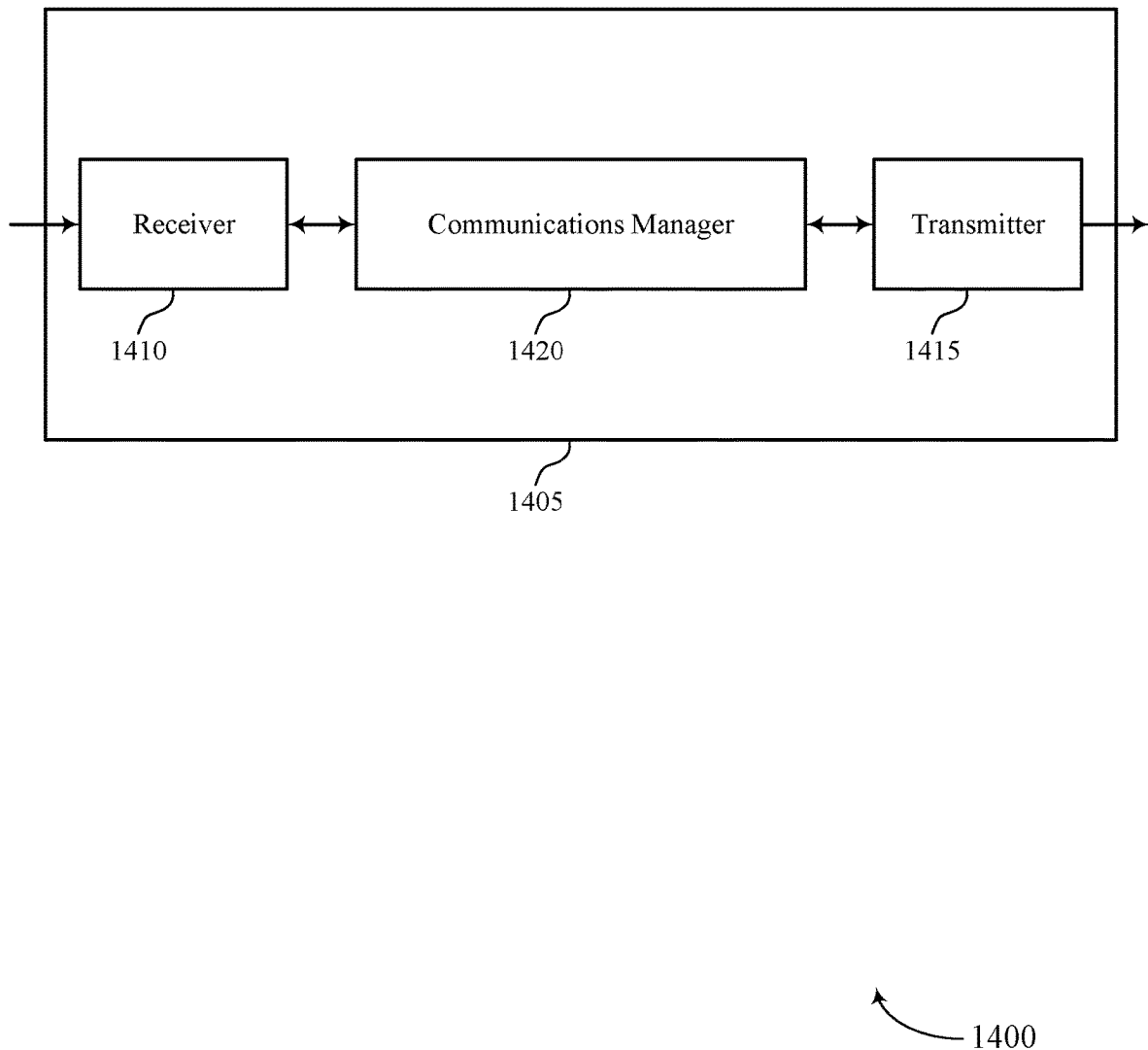
FIGS. 14 and 15 show block diagrams of devices that support a precoded PTRS sequence with distributed allocation in accordance with aspects of the present disclosure.

FIG. 14 shows a block diagram 1400 of a device 1405 that supports a precoded PTRS sequence with distributed allocation in accordance with aspects of the present disclosure. The device 1405 may be an example of aspects of one or more of a base station 105 or a UE 115 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to precoded PTRS sequence with distributed allocation). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to precoded PTRS sequence with distributed allocation). In some examples, the transmitter 1415 may be co-located with a receiver 1410 in a transceiver unit. The transmitter 1415 may utilize a single antenna or a set of multiple antennas.

The communications manager 1420, the receiver 1410, the transmitter 1415, or various combinations thereof or various components thereof may be examples of means for performing various aspects of precoded PTRS sequence with distributed allocation as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1420 may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication in accordance with examples as disclosed herein. For example, the communications manager 1420 may be configured as or otherwise support a means for precoding a PTRS sequence by applying a single DFT to the PTRS sequence, the DFT precoded PTRS sequence including a DFT precoded set of multiple symbols. The communications manager 1420 may be configured as or otherwise support a means for mapping the DFT precoded PTRS sequence to a subset of resources of a set of resources, the subset of resources including one or more PTRS resource elements. The communications manager 1420 may be configured as or otherwise support a means for transmitting a signal carrying the DFT precoded PTRS sequence.

By including or configuring the communications manager 1420 in accordance with examples as described herein, the device 1405 (e.g., a processor controlling or otherwise coupled to the receiver 1410, the transmitter 1415, the communications manager 1420, or a combination thereof) may support techniques for reduced processing, reduced power consumption, and more efficient utilization of communication resources.

Figure 15:
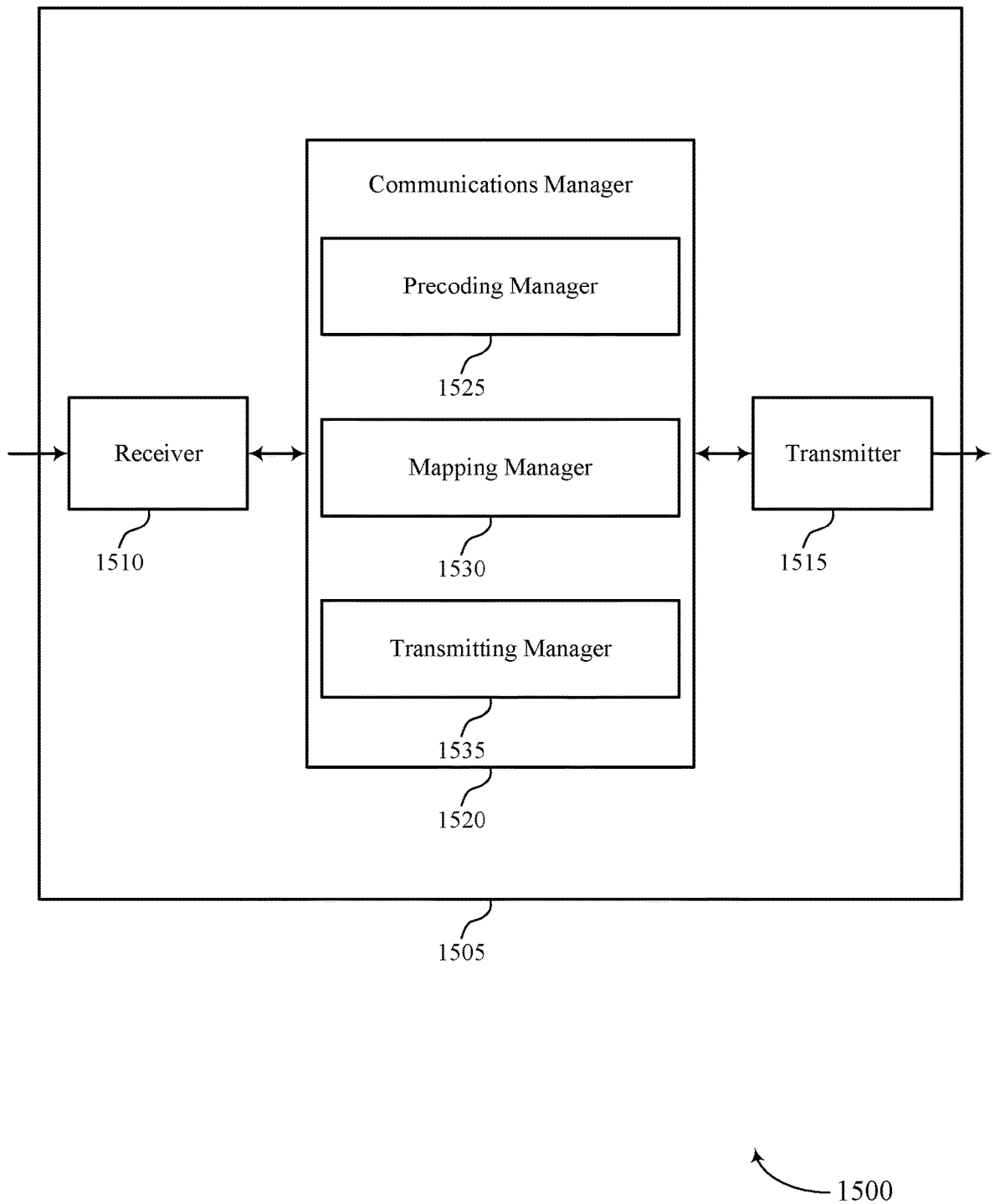

FIG. 15 shows a block diagram 1500 of a device 1505 that supports a precoded PTRS sequence with distributed allocation in accordance with aspects of the present disclosure. The device 1505 may be an example of aspects of a device 1405 or one or more of a base station 105 or a UE 115 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to precoded PTRS sequence with distributed allocation). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to precoded PTRS sequence with distributed allocation). In some examples, the transmitter 1515 may be co-located with a receiver 1510 in a transceiver unit. The transmitter 1515 may utilize a single antenna or a set of multiple antennas.

The device 1505, or various components thereof, may be an example of means for performing various aspects of precoded PTRS sequence with distributed allocation as described herein. For example, the communications manager 1520 may include a precoding manager 1525, a mapping manager 1530, a transmitting manager 1535, or any combination thereof. The communications manager 1520 may be an example of aspects of a communications manager 1420 as described herein. In some examples, the communications manager 1520, or various components thereof, may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communication in accordance with examples as disclosed herein. The precoding manager 1525 may be configured as or otherwise support a means for precoding a PTRS sequence by applying a single DFT to the PTRS sequence, the DFT precoded PTRS sequence including a DFT precoded set of multiple symbols. The mapping manager 1530 may be configured as or otherwise support a means for mapping the DFT precoded PTRS sequence to a subset of resources of a set of resources, the subset of resources including one or more PTRS resource elements. The transmitting manager 1535 may be configured as or otherwise support a means for transmitting a signal carrying the DFT precoded PTRS sequence.

Figure 16:
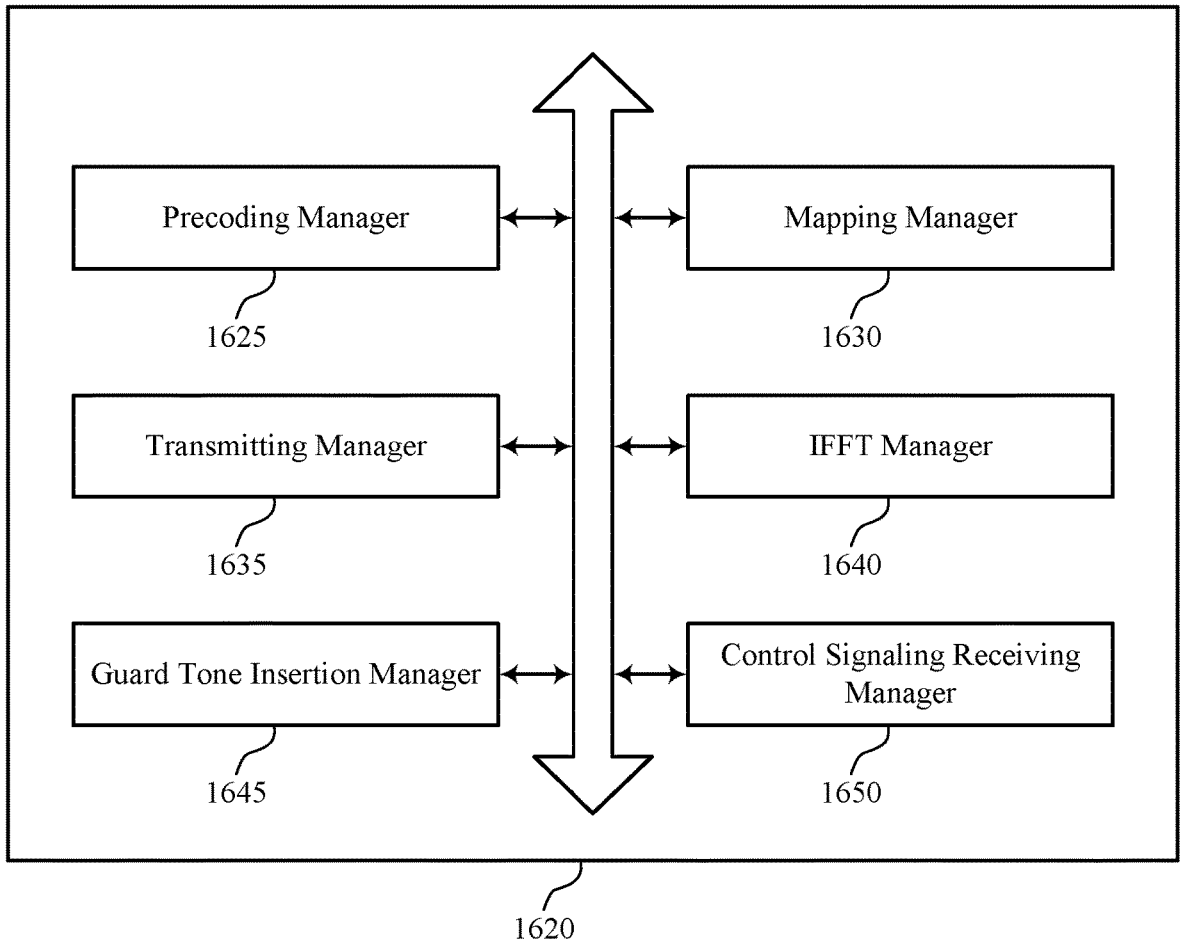
FIG. 16 shows a block diagram of a communications manager that supports a precoded PTRS sequence with distributed allocation in accordance with aspects of the present disclosure.

FIG. 16 shows a block diagram 1600 of a communications manager 1620 that supports a precoded PTRS sequence with distributed allocation in accordance with aspects of the present disclosure. The communications manager 1620 may be an example of aspects of a communications manager 1420, a communications manager 1520, or both, as described herein. The communications manager 1620, or various components thereof, may be an example of means for performing various aspects of precoded PTRS sequence with distributed allocation as described herein. For example, the communications manager 1620 may include a precoding manager 1625, a mapping manager 1630, a transmitting manager 1635, an IFFT manager 1640, a guard tone insertion manager 1645, a control signaling receiving manager 1650, or any combination thereof. Each of these components may communicate, directly or indirectly, with one another (e.g., via one or more buses).

The communications manager 1620 may support wireless communication in accordance with examples as disclosed herein. The precoding manager 1625 may be configured as or otherwise support a means for precoding a PTRS sequence by applying a single DFT to the PTRS sequence, the DFT precoded PTRS sequence including a DFT precoded set of multiple symbols. The mapping manager 1630 may be configured as or otherwise support a means for mapping the DFT precoded PTRS sequence to a subset of resources of a set of resources, the subset of resources including one or more PTRS resource elements. The transmitting manager 1635 may be configured as or otherwise support a means for transmitting a signal carrying the DFT precoded PTRS sequence.

In some examples, a number of DFT operations associated with the single DFT is less than a number of PTRS resource clusters. In some examples, the IFFT manager 1640 may be configured as or otherwise support a means for applying an IFFT to the mapped DFT precoded PTRS sequence. In some examples, to support mapping the DFT precoded PTRS sequence, the guard tone insertion manager 1645 may be configured as or otherwise support a means for inserting a set of multiple guard tones adjacent to the subset of resources of the set of resources, the subset of resources including the one or more PTRS resource elements. In some examples, the control signaling receiving manager 1650 may be configured as or otherwise support a means for receiving control signaling including an indication of a set of guard tones to insert adjacent to the subset of resources of the set of resources. In some examples, the control signaling includes an RRC signaling, a DCI message, or a MAC-CE.

In some examples, the control signaling receiving manager 1650 may be configured as or otherwise support a means for receiving control signaling including an indication of a quantity of the one or more PTRS resource elements included in the subset of resources of the set of resources. In some examples, the control signaling includes an RRC signaling, a DCI message, or a MAC-CE. In some examples, to support mapping the DFT precoded PTRS sequence, the mapping manager 1630 may be configured as or otherwise support a means for mapping the DFT precoded PTRS sequence to a set of multiple subsets of resources of the set of resources, each subset of resources including the one or more PTRS resource elements.

Figure 17:
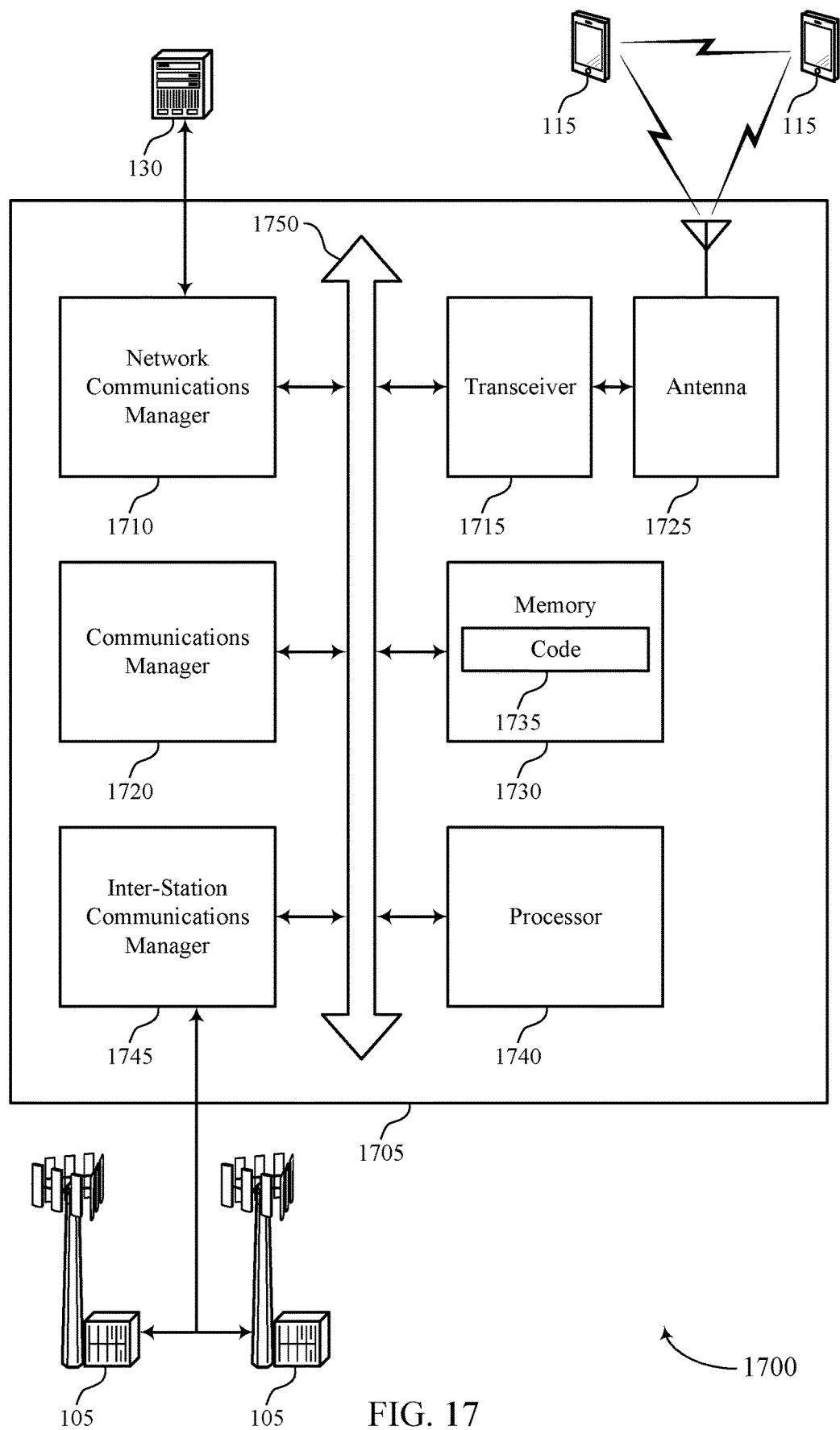
FIG. 17 shows a diagram of a system including a device that supports a precoded PTRS sequence with distributed allocation in accordance with aspects of the present disclosure.

FIG. 17 shows a diagram of a system 1700 including a device 1705 that supports a precoded PTRS sequence with distributed allocation in accordance with aspects of the present disclosure. The device 1705 may be an example of or include the components of a device 1405, a device 1505, or one or more of a base station 105 or a UE 115 as described herein. The device 1705 may include components for bi-directional voice and data communications including components for transmitting and receiving communications, such as a communications manager 1720, a network communications manager 1710, a transceiver 1715, an antenna 1725, a memory 1730, code 1735, a processor 1740, and an inter-station communications manager 1745. These components may be in electronic communication or otherwise coupled (e.g., operatively, communicatively, functionally, electronically, electrically) via one or more buses (e.g., a bus 1750).

The network communications manager 1710 may manage communications with a core network 130 (e.g., via one or more wired backhaul links). For example, the network communications manager 1710 may manage the transfer of data communications for client devices, such as one or more UEs 115.

In some cases, the device 1705 may include a single antenna 1725. However, in some other cases the device 1705 may have more than one antenna 1725, which may be capable of concurrently transmitting or receiving multiple wireless transmissions. The transceiver 1715 may communicate bi-directionally, via the one or more antennas 1725, wired, or wireless links as described herein. For example, the transceiver 1715 may represent a wireless transceiver and may communicate bi-directionally with another wireless transceiver. The transceiver 1715 may also include a modem to modulate the packets, to provide the modulated packets to one or more antennas 1725 for transmission, and to demodulate packets received from the one or more antennas 1725. The transceiver 1715, or the transceiver 1715 and one or more antennas 1725, may be an example of a transmitter 1415, a transmitter 1515, a receiver 1410, a receiver 1510, or any combination thereof or component thereof, as described herein.

The memory 1730 may include RAM and ROM. The memory 1730 may store computer-readable, computer-executable code 1735 including instructions that, when executed by the processor 1740, cause the device 1705 to perform various functions described herein. The code 1735 may be stored in a non-transitory computer-readable medium such as system memory or another type of memory. In some cases, the code 1735 may not be directly executable by the processor 1740 but may cause a computer (e.g., when compiled and executed) to perform functions described herein. In some cases, the memory 1730 may contain, among other things, a BIOS which may control basic hardware or software operation such as the interaction with peripheral components or devices.

The processor 1740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting precoded PTRS sequence with distributed allocation). For example, the device 1705 or a component of the device 1705 may include a processor 1740 and memory 1730 coupled to the processor 1740, the processor 1740 and memory 1730 configured to perform various functions described herein.

The inter-station communications manager 1745 may manage communications with other base stations 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communications network technology to provide communication between base stations 105.

The communications manager 1720 may support wireless communication in accordance with examples as disclosed herein. For example, the communications manager 1720 may be configured as or otherwise support a means for precoding a PTRS sequence by applying a single DFT to the PTRS sequence, the DFT precoded PTRS sequence including a DFT precoded set of multiple symbols. The communications manager 1720 may be configured as or otherwise support a means for mapping the DFT precoded PTRS sequence to a subset of resources of a set of resources, the subset of resources including one or more PTRS resource elements. The communications manager 1720 may be configured as or otherwise support a means for transmitting a signal carrying the DFT precoded PTRS sequence.

By including or configuring the communications manager 1720 in accordance with examples as described herein, the device 1705 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1720 may be configured to perform various operations (e.g., receiving, monitoring, transmitting) using or otherwise in cooperation with the transceiver 1715, the one or more antennas 1725, or any combination thereof. Although the communications manager 1720 is illustrated as a separate component, in some examples, one or more functions described with reference to the communications manager 1720 may be supported by or performed by the processor 1740, the memory 1730, the code 1735, or any combination thereof. For example, the code 1735 may include instructions executable by the processor 1740 to cause the device 1705 to perform various aspects of precoded PTRS sequence with distributed allocation as described herein, or the processor 1740 and the memory 1730 may be otherwise configured to perform or support such operations.

Figure 18:
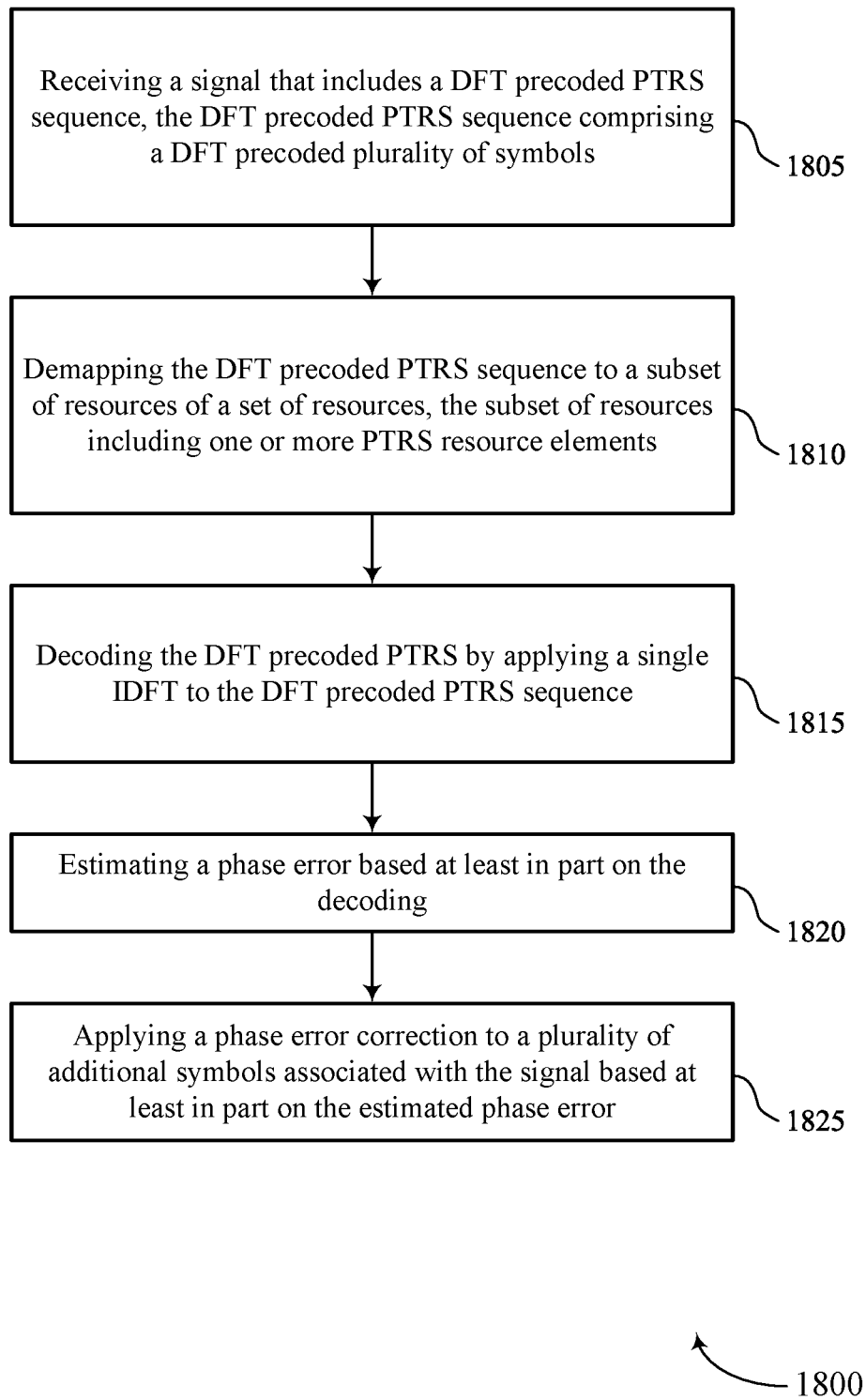
FIGS. 18 and 19 show flowcharts illustrating methods that support a precoded PTRS sequence with distributed allocation in accordance with aspects of the present disclosure.

FIG. 18 shows a flowchart illustrating a method 1800 that supports a precoded PTRS sequence with distributed allocation in accordance with aspects of the present disclosure. The operations of the method 1800 may be implemented by one or more of a base station 105 or a UE 115 or its components as described herein. For example, the operations of the method 1800 may be performed by one or more of a base station 105 or a UE 115 as described with reference to FIGS. 1 through 13. In some examples one or more of a base station 105 or a UE 115 may execute a set of instructions to control the functional elements of one or more of the base station 105 or the UE 115 to perform the described functions. Additionally or alternatively, one or more of a base station 105 or a UE 115 may perform aspects of the described functions using special-purpose hardware.

At 1805, the method may include receiving a signal that includes a DFT precoded PTRS sequence, the DFT precoded PTRS sequence comprising a DFT precoded plurality of symbols. The operations of 1805 may be performed in accordance with examples as disclosed herein. In some examples, aspects of the operations of 1805 may be performed by a receiving manager 1225 as described with reference to FIG. 12.

At 1810, the method may include demapping the DFT precoded PTRS sequence to a subset of resources of a set of resources, the subset of resources including one or more PTRS resource elements. The operations of 1810 may be performed in accordance with examples as disclosed herein. In some examples, aspects of the operations of 1810 may be performed by a demapping manager 1230 as described with reference to FIG. 12.

At 1815, the method may include decoding the DFT precoded PTRS by applying a single IDFT to the DFT precoded PTRS sequence. The operations of 1815 may be performed in accordance with examples as disclosed herein. In some examples, aspects of the operations of 1815 may be performed by a decoding manager 1235 as described with reference to FIG. 12.

At 1820, the method may include estimating a phase error based at least in part on the decoding. The operations of 1820 may be performed in accordance with examples as disclosed herein. In some examples, aspects of the operations of 1820 may be performed by a phase error estimating manager 1240 as described with reference to FIG. 12.

At 1825, the method may include applying a phase error correction to a plurality of additional symbols associated with the signal based at least in part on the estimated phase error. The operations of 1825 may be performed in accordance with examples as disclosed herein. In some examples, aspects of the operations of 1825 may be performed by a phase error correcting manager 1245 as described with reference to FIG. 12.

Figure 19:
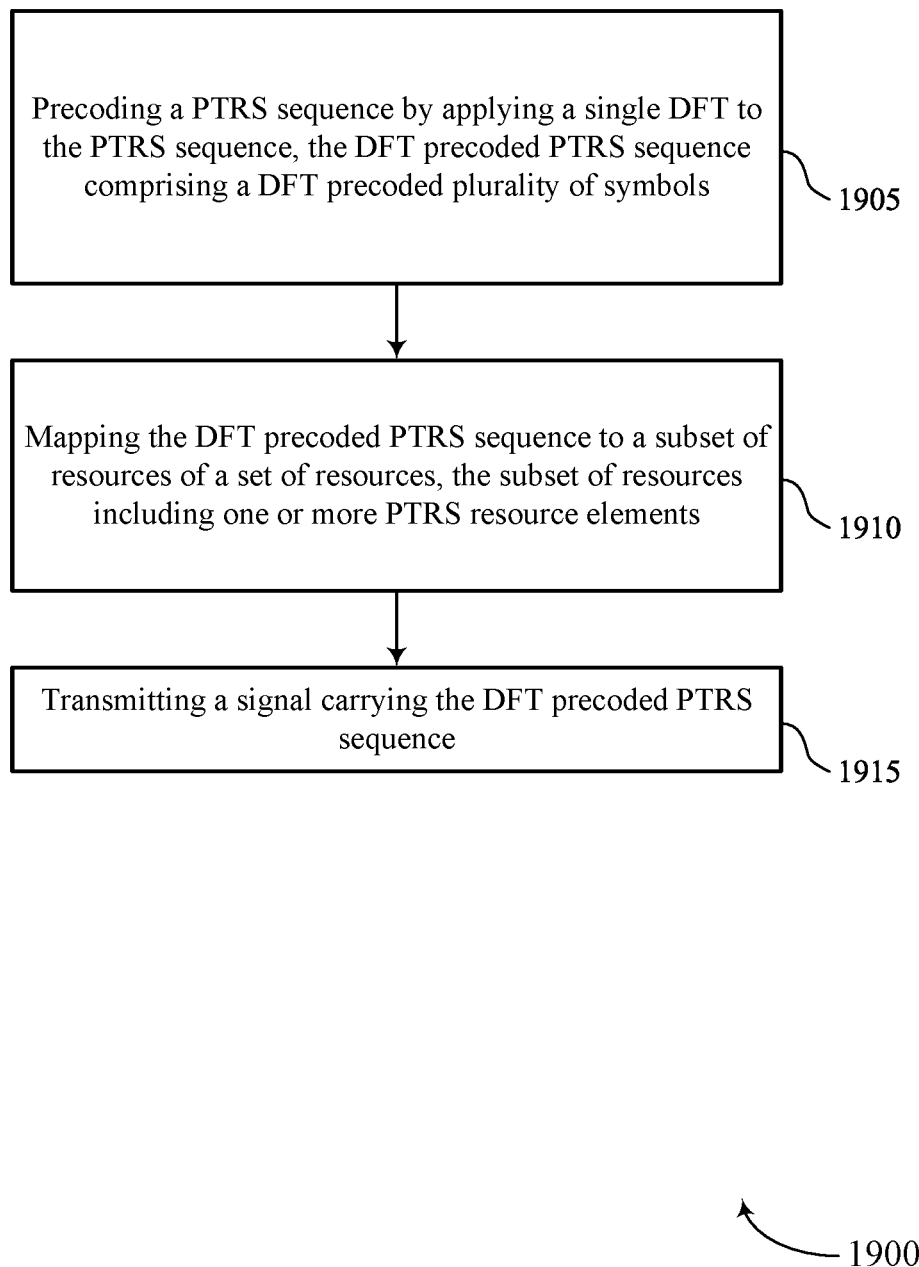

FIG. 19 shows a flowchart illustrating a method 1900 that supports a precoded PTRS sequence with distributed allocation in accordance with aspects of the present disclosure. The operations of the method 1900 may be implemented by one or more of a base station 105 or a UE 115 or its components as described herein. For example, the operations of the method 1900 may be performed by one or more of a base station 105 or a UE 115 as described with reference to FIGS. 1 through 9 and 14 through 17. In some examples, one or more of a base station 105 or a UE 115 may execute a set of instructions to control the functional elements of one or more of the base station 105 or the UE 115 to perform the described functions. Additionally or alternatively, one or more of a base station 105 or a UE 115 may perform aspects of the described functions using special-purpose hardware.

At 1905, the method may include precoding a PTRS sequence by applying a single DFT to the PTRS sequence, the DFT precoded PTRS sequence comprising a DFT precoded plurality of symbols. The operations of 1905 may be performed in accordance with examples as disclosed herein. In some examples, aspects of the operations of 1905 may be performed by a precoding manager 1625 as described with reference to FIG. 16.

At 1910, the method may include mapping the DFT precoded PTRS sequence to a subset of resources of a set of resources, the subset of resources including one or more PTRS resource elements. The operations of 1910 may be performed in accordance with examples as disclosed herein. In some examples, aspects of the operations of 1910 may be performed by a mapping manager 1630 as described with reference to FIG. 16.

At 1915, the method may include transmitting a signal carrying the DFT precoded PTRS sequence. The operations of 1915 may be performed in accordance with examples as disclosed herein. In some examples, aspects of the operations of 1915 may be performed by a transmitting manager 1635 as described with reference to FIG. 16.

The following provides an overview of aspects of the present disclosure:

Aspect 1: A method for wireless communication, comprising: receiving a signal that includes a DFT precoded PTRS sequence, the DFT precoded PTRS sequence comprising a DFT precoded plurality of symbols; demapping the DFT precoded PTRS sequence to a subset of resources of a set of resources, the subset of resources including one or more PTRS resource elements; decoding the DFT precoded PTRS by applying a single inverse DFT to the DFT precoded PTRS sequence; and estimating a phase error based at least in part on the decoding; and applying a phase error correction to a plurality of additional symbols associated with the signal based at least in part on the estimated phase error.

Aspect 2: The method of aspect 1, wherein a number of inverse DFT operations associated with the single inverse DFT is less than a number of PTRS resource clusters.

Aspect 3: The method of any of aspects 1 through 2, further comprising: applying a FFT to the received signal that includes the DFT precoded PTRS.

Aspect 4: The method of any of aspects 1 through 3, further comprising: applying a MMSE equalization to a portion of the demapped DFT precoded PTRS sequence.

Aspect 5: The method of any of aspects 1 through 4, further comprising: outputting an estimated time domain signal based at least in part on decoding the DFT precoded PTRS.

Aspect 6: The method of aspect 5, wherein estimating the phase error comprises: comparing the estimated time domain signal to the received signal that includes the DFT precoded PTRS sequence.

Aspect 7: The method of any of aspects 1 through 6, wherein estimating the phase error comprises: determining a phase noise coefficient.

Aspect 8: The method of any of aspects 1 through 7, further comprising: determining a set of guard tones adjacent to a set of PTRS tones.

Aspect 9: The method of aspect 8, further comprising: nulling a set of data tones; and refraining from nulling one or more of the set of guard tones or the set of PTRS tones.

Aspect 10: The method of any of aspects 1 through 9, wherein demapping the DFT precoded PTRS sequence comprises: demapping the DFT precoded PTRS sequence comprising the DFT precoded plurality of symbols to a plurality of subsets of resources of the set of resources, each subset of resources including the one or more PTRS resource elements.

Aspect 11: A method for wireless communication, comprising: precoding a PTRS sequence by applying a single DFT to the PTRS sequence, the DFT precoded PTRS sequence comprising a DFT precoded plurality of symbols; mapping the DFT precoded PTRS sequence to a subset of resources of a set of resources, the subset of resources including one or more PTRS resource elements; and transmitting a signal carrying the DFT precoded PTRS sequence.

Aspect 12: The method of aspect 11, wherein a number of DFT operations associated with the single DFT is less than a number of PTRS resource clusters.

Aspect 13: The method of any of aspects 11 through 12, further comprising: applying an IFFT to the mapped DFT precoded PTRS sequence.

Aspect 14: The method of any of aspects 11 through 13, wherein mapping the DFT precoded PTRS sequence comprises: inserting a plurality of guard tones adjacent to the subset of resources of the set of resources, the subset of resources including the one or more PTRS resource elements.

Aspect 15: The method of aspect 14, further comprising: receiving control signaling comprising an indication of a set of guard tones to insert adjacent to the subset of resources of the set of resources, wherein the control signaling comprises an RRC signaling, a DCI message, or a MAC-CE.

Aspect 16: The method of any of aspects 11 through 15, further comprising: receiving control signaling comprising an indication of a quantity of the one or more PTRS resource elements included in the subset of resources of the set of resources, wherein the control signaling comprises an RRC signaling, a DCI message, or a MAC-CE.

Aspect 17: The method of any of aspects 11 through 16, wherein mapping the DFT precoded PTRS sequence comprises: mapping the DFT precoded PTRS sequence to a plurality of subsets of resources of the set of resources, each subset of resources including the one or more PTRS resource elements.

Aspect 18: An apparatus for wireless communication, comprising a processor; and a memory coupled with the processor; wherein the memory comprises instructions executable by the processor to cause the apparatus to perform a method of any of aspects 1 through 10.

Aspect 19: An apparatus for wireless communication, comprising at least one means for performing a method of any of aspects 1 through 10.

Aspect 20: A non-transitory computer-readable medium storing code for wireless communication, the code comprising instructions executable by a processor to perform a method of any of aspects 1 through 10.

Aspect 21: An apparatus for wireless communication, comprising a processor; and a memory coupled with the processor; wherein the memory comprises instructions executable by the processor to cause the apparatus to perform a method of any of aspects 11 through 17.

Aspect 22: An apparatus for wireless communication, comprising at least one means for performing a method of any of aspects 11 through 17.

Aspect 23: A non-transitory computer-readable medium storing code for wireless communication, the code comprising instructions executable by a processor to perform a method of any of aspects 11 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication, comprising:
   receiving a signal that includes a discrete Fourier transform precoded phase tracking reference signal sequence, the discrete Fourier transform precoded phase tracking reference signal sequence comprising a discrete Fourier transform precoded plurality of symbols;
   demapping the discrete Fourier transform precoded phase tracking reference signal sequence to a subset of resources of a set of resources, the subset of resources including one or more phase tracking reference signal resource elements;
   decoding the discrete Fourier transform precoded phase tracking reference signal by applying a single inverse discrete Fourier transform to the discrete Fourier transform precoded phase tracking reference signal sequence;
   estimating a phase error based at least in part on the decoding; and
   applying a phase error correction to a plurality of additional symbols associated with the signal based at least in part on the estimated phase error.

2. The method of claim 1, wherein a number of inverse discrete Fourier transform operations associated with the single inverse discrete Fourier transform is less than a number of phase tracking reference signal resource clusters.

3. The method of claim 1, further comprising:
   applying a fast Fourier transform (FFT) to the received signal that includes the discrete Fourier transform precoded phase tracking reference signal.

4. The method of claim 1, further comprising:
   applying a minimum mean square error (MMSE) equalization to a portion of the demapped discrete Fourier transform precoded phase tracking reference signal sequence.

5. The method of claim 1, further comprising:
   outputting an estimated time domain signal based at least in part on decoding the discrete Fourier transform precoded phase tracking reference signal.

6. The method of claim 5, wherein estimating the phase error comprises:
   comparing the estimated time domain signal to the received signal that includes the discrete Fourier transform precoded phase tracking reference signal sequence.

7. The method of claim 1, wherein estimating the phase error comprises:
   determining a phase noise coefficient.

8. The method of claim 1, further comprising:
   determining a set of guard tones adjacent to a set of phase tracking reference signal tones.

9. The method of claim 8, further comprising:
   nulling a set of data tones; and
   refraining from nulling one or more of the set of guard tones or the set of phase tracking reference signal tones.

10. The method of claim 1, wherein demapping the discrete Fourier transform precoded phase tracking reference signal sequence comprises:
    demapping the discrete Fourier transform precoded phase tracking reference signal sequence comprising the discrete Fourier transform precoded plurality of symbols to a plurality of subsets of resources of the set of resources, each subset of resources including the one or more phase tracking reference signal resource elements.

11. A method for wireless communication, comprising:
    precoding a phase tracking reference signal sequence by applying a single discrete Fourier transform to the phase tracking reference signal sequence, the discrete Fourier transform precoded phase tracking reference signal sequence comprising a discrete Fourier transform precoded plurality of symbols;
    mapping the discrete Fourier transform precoded phase tracking reference signal sequence to a subset of resources of a set of resources, the subset of resources including one or more phase tracking reference signal resource elements; and
    transmitting a signal carrying the discrete Fourier transform precoded phase tracking reference signal sequence.

12. The method of claim 11, wherein a number of discrete Fourier transform operations associated with the single discrete Fourier transform is less than a number of phase tracking reference signal resource clusters.

13. The method of claim 11, further comprising:
applying an inverse fast Fourier transform (IFFT) to the mapped discrete Fourier transform precoded phase tracking reference signal sequence.

14. The method of claim 11, wherein mapping the discrete Fourier transform precoded phase tracking reference signal sequence comprises:
inserting a plurality of guard tones adjacent to the subset of resources of the set of resources, the subset of resources including the one or more phase tracking reference signal resource elements.

15. The method of claim 14, further comprising:
receiving control signaling comprising an indication of a set of guard tones to insert adjacent to the subset of resources of the set of resources,
wherein the control signaling comprises a radio resource control (RRC) signaling, a downlink control information (DCI) message, or a medium access control (MAC) control element (MAC-CE).

16. The method of claim 11, further comprising:
receiving control signaling comprising an indication of a quantity of the one or more phase tracking reference signal resource elements included in the subset of resources of the set of resources,
wherein the control signaling comprises a radio resource control (RRC) signaling, a downlink control information (DCI) message, or a medium access control (MAC) control element (MAC-CE).

17. The method of claim 11, wherein mapping the discrete Fourier transform precoded phase tracking reference signal sequence comprises:
mapping the discrete Fourier transform precoded phase tracking reference signal sequence to a plurality of subsets of resources of the set of resources, each subset of resources including the one or more phase tracking reference signal resource elements.

18. An apparatus for wireless communication, comprising:
a processor; and
a memory coupled with the processor, wherein the memory comprises instructions executable by the processor to cause the apparatus to:
receive a signal that includes a discrete Fourier transform precoded phase tracking reference signal sequence, the discrete Fourier transform precoded phase tracking reference signal sequence comprising a discrete Fourier transform precoded plurality of symbols;
demap the discrete Fourier transform precoded phase tracking reference signal sequence to a subset of resources of a set of resources, the subset of resources including one or more phase tracking reference signal resource elements;
decode the discrete Fourier transform precoded phase tracking reference signal by applying a single inverse discrete Fourier transform to the discrete Fourier transform precoded phase tracking reference signal sequence;
estimate a phase error based at least in part on the decoding; and
apply a phase error correction to a plurality of additional symbols associated with the signal based at least in part on the estimated phase error.

19. The apparatus of claim 18, wherein a number of inverse discrete Fourier transform operations associated with the single inverse discrete Fourier transform is less than a number of phase tracking reference signal resource clusters.

20. The apparatus of claim 18, wherein the instructions are further executable by the processor to cause the apparatus to:
apply a fast Fourier transform (FFT) to the received signal that includes the discrete Fourier transform precoded phase tracking reference signal.

21. The apparatus of claim 18, wherein the instructions are further executable by the processor to cause the apparatus to:
apply a minimum mean square error (MMSE) equalization to a portion of the demapped discrete Fourier transform precoded phase tracking reference signal sequence.

22. The apparatus of claim 18, wherein the instructions are further executable by the processor to cause the apparatus to:
output an estimated time domain signal based at least in part on decoding the discrete Fourier transform precoded phase tracking reference signal.

23. The apparatus of claim 22, wherein the instructions to estimate the phase error are executable by the processor to cause the apparatus to:
compare the estimated time domain signal to the received signal that includes the discrete Fourier transform precoded phase tracking reference signal sequence.

24. The apparatus of claim 18, wherein the instructions to estimate the phase error are executable by the processor to cause the apparatus to:
determine a phase noise coefficient.

25. The apparatus of claim 18, wherein the instructions are further executable by the processor to cause the apparatus to:
determine a set of guard tones adjacent to a set of phase tracking reference signal tones.

26. The apparatus of claim 25, wherein the instructions are further executable by the processor to cause the apparatus to:
null a set of data tones; and
refrain from nulling one or more of the set of guard tones or the set of phase tracking reference signal tones.

27. The apparatus of claim 18, wherein the instructions to demap the discrete Fourier transform precoded phase tracking reference signal sequence are executable by the processor to cause the apparatus to:
demap the discrete Fourier transform precoded phase tracking reference signal sequence comprising the discrete Fourier transform precoded plurality of symbols to a plurality of subsets of resources of the set of resources, each subset of resources including the one or more phase tracking reference signal resource elements.

28. An apparatus for wireless communication, comprising:
a processor; and
a memory coupled with the processor, wherein the memory comprises instructions executable by the processor to cause the apparatus to:
precode a phase tracking reference signal sequence by applying a single discrete Fourier transform to the phase tracking reference signal sequence, the discrete Fourier transform precoded phase tracking reference signal sequence comprising a discrete Fourier transform precoded plurality of symbols;

map the discrete Fourier transform precoded phase tracking reference signal sequence to a subset of resources of a set of resources, the subset of resources including one or more phase tracking reference signal resource elements; and transmit a signal carrying the discrete Fourier transform precoded phase tracking reference signal sequence.

29. The apparatus of claim 28, wherein a number of discrete Fourier transform operations associated with the single discrete Fourier transform is less than a number of phase tracking reference signal resource clusters.

30. The apparatus of claim 28, wherein the instructions are further executable by the processor to cause the apparatus to:

apply an inverse fast Fourier transform (IFFT) to the mapped discrete Fourier transform precoded phase tracking reference signal sequence.

\* \* \* \* \*